(12) United States Patent
Hao et al.

(10) Patent No.: US 12,028,760 B2
(45) Date of Patent: Jul. 2, 2024

(54) COMMUNICATION METHOD, APPARATUS, AND SYSTEM

(71) Applicant: HUAWEI TECHNOLOGIES CO., LTD., Guangdong (CN)

(72) Inventors: Jinping Hao, Shanghai (CN); Su Huang, Shanghai (CN); Yinghao Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 187 days.

(21) Appl. No.: 17/390,299

(22) Filed: Jul. 30, 2021

(65) Prior Publication Data
US 2022/0038969 A1 Feb. 3, 2022

Related U.S. Application Data

(63) Continuation of application No. PCT/CN2020/106440, filed on Jul. 31, 2020.

(51) Int. Cl.
*H04W 36/00* (2009.01)
*H04W 36/32* (2009.01)

(52) U.S. Cl.
CPC ....... *H04W 36/0083* (2013.01); *H04W 36/32* (2013.01)

(58) Field of Classification Search
CPC ............ H04W 36/0083; H04W 36/32
USPC ....................................... 455/436
See application file for complete search history.

(56) References Cited

U.S. PATENT DOCUMENTS

| 2013/0028138 A1 | 1/2013 | Hao et al. |
| 2018/0227894 A1 | 8/2018 | Noh et al. |
| 2020/0137715 A1 | 4/2020 | Edge et al. |
| 2022/0210612 A1* | 6/2022 | Keating ............ G01S 5/017 |

FOREIGN PATENT DOCUMENTS

| CN | 101087447 A | 12/2007 |
| CN | 101572896 A | 11/2009 |
| CN | 101784086 A | 7/2010 |
| CN | 101917765 A | 12/2010 |
| CN | 102892161 A | 1/2013 |
| CN | 103002528 A | 3/2013 |
| CN | 103874150 A | 6/2014 |
| CN | 104322120 A | 1/2015 |

(Continued)

OTHER PUBLICATIONS

Office Action issued in Chinese Application No. 202110294832.9 on Nov. 22, 2021, 30 pages (with English translation).

(Continued)

*Primary Examiner* — Joel Ajayi
(74) *Attorney, Agent, or Firm* — Fish & Richardson P.C.

(57) ABSTRACT

This application provides a communication method, apparatus, and system, which may be used to position a terminal device in a handover scenario, so that continuity of a positioning service can be maintained, and a positioning success rate can be improved. The method includes: A communication device sends a first message to a location management function network element after determining that a terminal device is handed over to a target cell, where the first message includes identifier information of the target cell, so that the location management function network element receives the first message.

20 Claims, 12 Drawing Sheets

(56) References Cited

FOREIGN PATENT DOCUMENTS

| | | |
|---|---|---|
| CN | 104737585 A | 6/2015 |
| CN | 104956745 A | 9/2015 |
| CN | 108886457 A | 11/2018 |
| CN | 110912666 A | 3/2020 |
| CN | 111200850 A | 5/2020 |
| CN | 111278130 A | 6/2020 |
| CN | 111356075 A | 6/2020 |
| CN | 111357231 A | 6/2020 |
| CN | 111372308 A | 7/2020 |
| EP | 3448086 A1 | 2/2019 |
| TW | 201939974 A | 10/2019 |
| WO | 2017193286 A1 | 11/2017 |
| WO | 2020089276 A1 | 5/2020 |
| WO | 2020092714 A1 | 5/2020 |
| WO | 2020135850 A1 | 7/2020 |
| WO | 2020146739 A1 | 7/2020 |

OTHER PUBLICATIONS

Huawei, HiSilicon, "[Offline-611][POS] Summary on support of non-periodic SRS cases," 3GPP TSG-RAN WG2 Meeting #109-e, R2-2001935, Feb. 24-Mar. 6, 2020, 9 pages.

Office Action issued in Chinese Application No. 202110294832.9 on Jun. 13, 2022, 11 pages.

3GPP TS 38.305 V16.0.0 (Mar. 2020), 3rd Generation Partnership Project; Technical Specification Group Radio Access Network; NG Radio Access Network (NG-RAN); Stage 2 functional specification of User Equipment (UE) positioning in NG-RAN(Release 16), 107 pages.

Office Action issued in Taiwanese Application No. 110128188 on May 19, 2022, 24 pages (with English translation).

3GPP TS 38.211 V16.2.0 (Jun. 2020), "3rd Generation Partnership Project; Technical Specification Group Radio Access Network;NR;Physical channels and modulation(Release 16)," Jun. 2020, 131 pages.

3GPP TS 38.212 V16.2.0 (Jun. 2020), "3rd Generation Partnership Project; Technical Specification Group Radio Access Network;NR;Multiplexing and channel coding(Release 16)," Jun. 2020, 151 pages.

3GPP TS 38.213 V16.2.0 (Jun. 2020), "3rd Generation Partnership Project; Technical Specification Group Radio Access Network;NR;Physical layer procedures for control(Release 16)," Jun. 2020, 176 pages.

3GPP TS 38.214 V16.2.0 (Jul. 2020), "3rd Generation Partnership Project; Technical Specification Group Radio Access Network;NR;Physical layer procedures for data(Release 16)," Jun. 2020, 163 pages.

Huawei, HiSilicon, "Remaining issues on DCI contents and formats," 3GPP TSG RAN WG1 Meeting #92bis, R1-1803707, Sanya, China, Apr. 16-20, 2018, 9 pages.

Nokia, Nokia Shanghai Bell, "LMF Services definition," 3GPP TSG-SA WG2 Meeting #131, S2-1902217, Tenerife, Spain, Feb. 25-Mar. 1, 2019, 2 pages.

PCT International Search Report and Written Opinion issued in International Application No. PCT/CN2020/106440 on Apr. 26, 2021, 9 pages.

3GPP TS 23.273, V16.4.0 (Jul. 2020), "3rd Generation Partnership Project; Technical Specification Group Services and System Aspects; 5G System (5GS) Location Services (LCS); Stage 2 (Release 16)," Jul. 2020, 96 pages.

Extended European Search Report issued in European Application No. 20920768.7 on Apr. 5, 2022, 11 pages.

Huawei et al., "Considerations on Angle-based positioning technique in NR," 3GPP TSG-RAN WG2 Meeting #105bis, R2-1904102, Xi'an, China, Apr. 8-12, 2019, 10 pages.

Liu, "Inter-Cell Interference Coordination Research for LTE System," Master Thesis, Beijing University of Posts and Telecommunications, Aug. 2012, 82 pages (English Abstract).

Office Action issued in Chinese Application No. 202080004987.8 on Sep. 5, 2022, 7 pages.

Office Action issued in Chinese Application No. 202110294832.9 on Sep. 2, 2022, 5 pages.

TruePosition, "SRS Update for UTDOA on Intra-MME Handover," 3GPP TSG-RAN WG3 Meeting #77, R3-121718, Qingdao, China, Aug. 13-17, 2012, 4 pages.

Wang et al., "Tunable and Switchable Multi-Wavelength Erbium-Brillouin Random Fiber Laser Incorporating a Highly Nonlinear Fiber," Journal of Lightwave Technology, vol. 38, No. 15, Aug. 1, 2020, 7 pages.

Zhang, "LTE Core Technology Application and System Architecture Research," Master Thesis, Nanjing University of Posts and Telecommunications, Feb. 2015, 75 pages (English Abstract).

3GPP TS 23.271 V9.3.0, "3rd Generation Partnership Project; Technical Specification Group Services and System Aspects; Functional stage 2 description of Location Services (LCS) (Release 9)," Mar. 2010, 169 pages.

CATT, "Discussion of NR positioning enhancements," 3GPP TSG RAN WG1 Meeting #101, R1-2003642, e-meeting, May 25-Jun. 5, 2020, 18 pages.

RAN3, "Reply LS on the status update of the SON support for NR works," 3GPP TSG-RAN WG3 Meeting #107bis-e, R3-202630, Online, Apr. 20-30, 2020, 1 page.

Ericsson, "(TP to TS 38.455 BL CR): support of Aperiodic positioning of SRS configuration and other aspects," 3GPP TSG-RAN WG3 #108-e, R3-203738, Online, Jun. 1-11, 2020, 8 pages.

Ericsson, "UE Rx-Tx Measurement Report Mapping in NR in 38.133," 3GPP TSG-RAN4 Meeting #95-e, R4-2009113, Electronic Meeting, May 25-Jun. 5, 2020, 7 pages.

Office Action in Japanese Appln. No. 2023-506321, mailed on Jan. 9, 2024, 19 pages (with English translation).

Huawei et al., "RAN procedures for NR positioning," 3GPP TSG RAN WG1 Meeting #100-e, R1-2000194, Feb. 24-Mar. 6, 2020, 7 pages.

EP Communication Pursuant to Article 94(3) EPC in European Appln No. 20920768.7, dated Mar. 14, 2024, 6 pages.

Office Action in Indian Appln. No. 202337013033, mailed on Feb. 26, 2024, 5 pages (with English translation).

* cited by examiner

COMMUNICATION METHOD, APPARATUS, AND SYSTEM

CROSS-REFERENCE TO RELATED APPLICATIONS

This application is a continuation of International Application No. PCT/CN2020/106440, filed on Jul. 31, 2020, the disclosure of which is hereby incorporated by reference in its entirety.

TECHNICAL FIELD

This application relates to the field of communication technologies, and in particular, to a communication method, apparatus, and system.

BACKGROUND

Positioning is one of important functions of a 5th generation (5G) (also referred to as new radio (NR)) communication system, and a plurality of positioning technologies including uplink positioning is defined in the 3rd generation partnership project (3GPP) R16. The uplink positioning may include uplink time difference of arrival (UL-TDOA) positioning and uplink angle of arrival (uplink angle of arrival, UL-AOA) positioning.

In the uplink positioning, a location management function (LMF) network element requests a serving base station of a terminal to configure a sounding reference signal (SRS) for the terminal, and selects a base station for measuring to measure an SRS sent by the terminal. After performing measurement, the base station for measuring reports a measurement result of the SRS to the LMF network element, so that the LMF network element determines a location of the terminal based on the measurement result. The base station for measuring usually includes a serving base station of the terminal device or a base station of a neighboring cell. In addition, the LMF network element may configure the base station for measuring to periodically measure an SRS of the terminal and report a measurement result.

During actual application, the terminal may move and be handed over to another cell. In this case, if a positioning service of the terminal has not ended, the base station for measuring selected by the LMF network element before the terminal is handed over may not continue to measure an SRS of the terminal, causing a positioning failure.

SUMMARY

Embodiments of this application provide a communication method, apparatus, and system, to maintain continuity of a positioning service and improve a positioning success rate.

To achieve the foregoing objectives, the following technical solutions are used in the embodiments of this application.

According to a first aspect, a communication method is provided. The communication method includes: A location management function network element receives a first message from a communication device, where the first message includes identifier information of a target cell. The location management function network element sends a second message to an access network device for measuring, where the second message is used to request to measure a sounding reference signal SRS sent by a terminal device, and the SRS is used to determine a location of the terminal device after the terminal device is handed over to the target cell.

Based on this solution, after the terminal device is handed over, the location management function network element may receive the identifier information of the target cell from the communication device, so that the location management function network element perceives the handover of the terminal device; and send the second message to the access network device for measuring based on an identifier of the target cell, to request the access network device for measuring to measure the SRS of the terminal device, so that the location management function network element can finally determine, based on a measurement result reported by the access network device for measuring, the location of the terminal device after the terminal device is handed over to the target cell, thereby completing positioning, maintaining positioning continuity, and improving a positioning success rate.

In some possible designs, the communication method may further include: The location management function network element determines the access network device for measuring based on the first message. Based on the possible designs, after the terminal device is handed over to the target cell, the location management function network element may determine the access network device for measuring based on the identifier of the target cell.

In some possible designs, the communication method may further include: The location management function network element receives a measurement result of the SRS, and determines, based on the measurement result of the SRS, the location of the terminal device after the terminal device is handed over to the target cell. Based on the possible designs, the location management function network element may determine, based on the measurement result reported by the access network device for measuring, the location of the terminal device after the terminal device is handed over to the target cell, thereby completing positioning, maintaining positioning continuity, and improving a positioning success rate.

In some possible designs, the first message further includes first indication information, and the first indication information is used to indicate that the terminal device is handed over. Based on the possible designs, the location management function network element may perceive the handover of the terminal device.

In some possible designs, the communication method may further include: The location management function network element sends, to the access network device for measuring, information about a transmission reception point TRP of the access network device for measuring, where the information about the TRP is used to indicate the TRP that is in the access network device for measuring and that is configured to measure the SRS. Based on the possible designs, the TRP that measures the SRS may be indicated to the access network device for measuring, to avoid a waste of power consumption and resources of the access network device for measuring when the access network device for measuring uses all TRPs to measure the SRS.

In some possible designs, the communication method may further include: The location management function network element receives first SRS configuration information from a target access network device, where the first SRS configuration information is used by the terminal device to send the SRS. The location management function network element sends the first SRS configuration information to the access network device for measuring.

In some possible designs, the access network device for measuring includes a first access network device for measuring, where the first access network device for measuring is an access network device that does not measure the SRS of the terminal device before the terminal device is handed over to the target cell. The communication method may further include: The location management function network element receives second indication information from the target access network device, where the second indication information is used to indicate that the target access network device does not update second SRS configuration information, and the second SRS configuration information is SRS configuration information determined by a source access network device. The location management function network element sends the second SRS configuration information to the first access network device for measuring.

In some possible designs, the communication method may further include: The location management function network element sends a request message to the target access network device, where the request message is used to request the target access network device to configure an SRS for the terminal device. In other words, the request message is used to request the SRS configuration information.

In some possible designs, the request message includes periodicity information of the SRS and/or frequency information of the SRS, the periodicity information is used to indicate a periodicity of the SRS, and the frequency information is used to indicate a frequency of the SRS or is used to indicate a frequency of an SRS carrier.

Based on the possible designs, the location management function network element includes the periodicity information in the request message, to recommend the periodicity of the SRS to the target access network device, so that the target access network device can configure, based on the periodicity recommended by the location management function network element, a periodicity of sending the SRS by the terminal device. Therefore, the periodicity that is of the SRS and that is configured by the target access network device is close to or equal to a periodicity that is of the SRS and that is expected by the location management function network element, so that the location management function network element controls a measurement delay of the SRS based on the sending periodicity of the SRS, to control a delay of a positioning service and meet a requirement of the positioning service.

Based on the possible designs, when the location management function network element includes the frequency information in the request message, the location management function network element may recommend (or indicate) the frequency used for the SRS to the target access network device, so that the target access network device may configure the SRS for the terminal device according to the recommendation of the location management function network element. Therefore, a problem that an access network device for measuring selected by the location management function network element cannot measure the SRS because the target access network device configures an SRS at another frequency is avoided, and an SRS measurement success rate is improved, so that a positioning success rate is improved.

In some possible designs, the access network device for measuring includes a second access network device for measuring, where the second access network device for measuring is an access network device that is configured to measure the SRS of the terminal device before the terminal device is handed over to the target cell. Before the location management function network element sends the second message to the second access network device for measuring, the communication method may further include: The location management function network element sends a notification message to the second access network device for measuring, where the notification message is used to notify the second access network device for measuring to stop measuring the SRS. That is, the location management function network element may first indicate the second access network device for measuring to stop performing measurement based on an SRS configuration of the terminal device before the handover, and then request the second access network device for measuring to perform measurement based on an SRS configuration of the terminal device after the handover.

It may be understood that the location management function network element may consider that the target access network device does not continue to use the second SRS configuration information. To be specific, when receiving the first SRS configuration information from the target access network device, the location management function network element sends the notification message to the second access network device for measuring.

Based on the possible designs, the second access network device for measuring may stop measuring the SRS configured by the source access network device, and release measurement resources of the access network device for measuring, thereby reducing power consumption of the second access network device for measuring.

In some possible designs, the communication method may further include: The location management function network element sends third indication information to the target access network device, where the third indication information is used to indicate a reporting granularity of a measurement quantity of the SRS.

Based on the possible designs, the location management function network element may indicate the reporting granularity of the measurement quantity to the access network device for measuring, thereby ensuring precision of a measurement result and precision of a positioning result, and improving positioning accuracy.

In some possible designs, the communication method may further include: The location management function network element sends fourth indication information to the target access network device, where the fourth indication information is used to indicate that the target access network device stops configuring the SRS for the terminal device.

Based on the possible designs, the target access network device may stop configuring the SRS for the terminal device, so that the terminal device may stop sending the SRS based on a configuration of the target access network device, thereby releasing resources of the terminal device, reducing impact on service performance of the terminal device, and reducing energy consumption of the terminal device.

According to a second aspect, a communication method is provided. The communication method includes: A communication device determines that a terminal device is handed over to a target cell. The communication device sends a first message to a location management function network element, where the first message includes identifier information of the target cell.

Based on this solution, after the terminal device is handed over, the communication device may send the identifier information of the target cell to the location management function network element, so that the location management function network element perceives the handover of the terminal device; and send a second message to an access network device for measuring based on an identifier of the target cell, to request the access network device for measuring to measure an SRS of the terminal device, so that the location management function network element can finally determine, based on a measurement result reported by the access network device for measuring, a location of the terminal device after the terminal device is handed over to the target cell, thereby completing positioning, maintaining positioning continuity, and improving a positioning success rate.

In some possible designs, the first message further includes first indication information, and the first indication information is used to indicate that the terminal device is handed over.

In some possible designs, the communication device is a source access network device, and that a communication device determines that a terminal device is handed over to a target cell may include: When the source access network device receives a third message from a target access network device, the source access network device determines that the terminal device is handed over to the target cell, where the third message is used to notify the source access network device to release a context of the terminal device, or used to request a context of the terminal device from the source access network device.

In some possible designs, the communication device is a target access network device. Before the target access network device sends the first message to the location management function network element, the communication method further includes: The target access network device receives identifier information of the location management function network element and information about a sounding reference signal SRS from the source access network device, where the information about the SRS is used to indicate a transmission characteristic of the SRS.

In some possible designs, the communication method may further include: The target access network device sends first SRS configuration information to the location management function network element, where the first SRS configuration information is used by the terminal device to send the SRS, and the SRS is used to determine a location of the terminal device.

In some possible designs, the communication method may further include: The target access network device sends second indication information to the location management function network element, where the second indication information is used to indicate that the target access network device does not update second SRS configuration information, and the second SRS configuration information is SRS configuration information determined by the source access network device.

In some possible designs, the communication method may further include: The target access network device receives a request message from the location management function network element, where the request message is used to request the SRS configuration information.

In some possible designs, the request message includes periodicity information of the SRS and/or frequency information of the SRS, the periodicity information is used to indicate a periodicity of the SRS, and the frequency information is used to indicate a frequency of the SRS or is used to indicate a frequency of an SRS carrier.

In some possible designs, the communication device is a mobility management function network element, and that a communication device determines that a terminal device is handed over to a target cell may include: When the mobility management function network element receives a fourth message from the target access network device, the mobility management function network element determines that the terminal device is handed over to the target cell, where the fourth message is used to request to hand over a downlink data path of the terminal device to the target access network device.

According to a third aspect, a communication method is provided. The communication method includes: A location management function network element determines periodicity information and/or frequency information of an SRS, where the periodicity information is used to indicate a periodicity of the SRS, and the frequency information is used to indicate a frequency of the SRS or indicate a frequency of a carrier used to transmit the SRS. The location management function network element sends the periodicity information and/or the frequency information to a serving access network device. The serving access network device may be an access network device to which a current serving cell of a terminal device belongs.

Based on this solution, the location management function network element sends the periodicity information to the serving access network device, to recommend the periodicity of the SRS to the serving access network device, so that the serving access network device can configure, based on the periodicity recommended by the location management function network element, a periodicity of sending the SRS by the terminal device. Therefore, the periodicity that is of the SRS and that is configured by the serving access network device is close to or equal to a periodicity that is of the SRS and that is expected by the location management function network element, so that the location management function network element controls a measurement delay of the SRS based on the sending periodicity of the SRS, to control a delay of a positioning service and meet a requirement of the positioning service.

Based on this solution, the location management function network element sends the frequency information to the serving access network device, and may recommend (or indicate) the frequency used for the SRS to the serving access network device, so that the serving access network device may configure the SRS for the terminal device according to the recommendation of the location management function network element. Therefore, a problem that an access network device for measuring selected by the location management function network element cannot measure the SRS because the serving access network device configures an SRS at another frequency is avoided, and an SRS measurement success rate is improved, so that a positioning success rate is improved.

According to a fourth aspect, a communication method is provided. The communication method includes: A location management function network element determines a reporting granularity of a measurement quantity of an SRS. The location management function network element sends indication information to an access network device for measuring, where the indication information is used to indicate the reporting granularity of the measurement quantity of the SRS.

Based on this solution, the location management function network element may indicate the reporting granularity of the measurement quantity to the access network device for measuring, thereby ensuring precision of a measurement result and precision of a positioning result, and improving positioning accuracy.

According to a fifth aspect, a communication method is provided. The communication method includes: A location management function network element generates indication information, where the indication information is used to indicate to stop configuring an SRS for a terminal device. The location management function network element sends the indication information to a serving access network device.

Based on this solution, a target access network device may stop configuring the SRS for the terminal device, so that the terminal device may stop sending the SRS based on a configuration of the target access network device, thereby releasing resources of the terminal device, reducing impact on service performance of the terminal device, and reducing energy consumption of the terminal device.

According to a sixth aspect, a communication method is provided. The communication method includes: A communication device determines that a terminal device is handed over to a target cell; and sends a first message to a location management function network element, where the first message includes identifier information of the target cell. The location management function network element receives the first message from the communication device, and sends a second message to a access network device for measuring, where the second message is used to request to measure a sounding reference signal SRS sent by the terminal device, and the SRS is used to determine a location of the terminal device after the terminal device is handed over to the target cell.

According to a seventh aspect, a communication apparatus is provided, and is configured to implement any one of the methods according to the foregoing aspects. In some implementations, the communication apparatus may be the location management function network element in the first aspect, the third aspect, the fourth aspect, or the fifth aspect, an apparatus including the location management function network element, or an apparatus included in the location management function network element, for example, a chip. Alternatively, in some other implementations, the communication apparatus may be the communication device in the second aspect, an apparatus including the communication device, or an apparatus included in the communication device. The communication apparatus includes a corresponding module, unit, or means for implementing the foregoing method. The module, unit, or means may be implemented by hardware, software, or hardware by executing corresponding software. The hardware or the software includes one or more modules or units corresponding to the foregoing functions.

In an implementation scenario, the communication apparatus may be the foregoing location management function network element, and the communication apparatus includes a receiving module and a sending module. Optionally, the communication apparatus may further include a processing module.

In an implementation of the implementation scenario: The receiving module is configured to receive a first message from a communication device, where the first message includes identifier information of a target cell. The sending module is configured to send a second message to an access network device for measuring, where the second message is used to request to measure a sounding reference signal SRS sent by a terminal device, and the SRS is used to determine a location of the terminal device after the terminal device is handed over to the target cell.

In some possible designs, the receiving module is further configured to receive a measurement result of the SRS. The processing module is configured to determine, based on the measurement result of the SRS, the location of the terminal device after the terminal device is handed over to the target cell.

In some possible designs, the sending module is further configured to send, to the access network device for measuring, information about a transmission reception point TRP of the access network device for measuring, where the information about the TRP is used to indicate the TRP that is in the access network device for measuring and that is configured to measure the SRS.

In some possible designs, the receiving module is further configured to receive first SRS configuration information from a target access network device, where the first SRS configuration information is used by the terminal device to send the SRS. The sending module is further configured to send the first SRS configuration information to the access network device for measuring.

In some possible designs, the receiving module is further configured to receive second indication information from the target access network device, where the second indication information is used to indicate that the target access network device does not update second SRS configuration information, and the second SRS configuration information is SRS configuration information determined by a source access network device. The sending module is further configured to send the second SRS configuration information to a first access network device for measuring.

In some possible designs, the sending module is further configured to send a request message to the target access network device, where the request message is used to request the target access network device to configure an SRS for the terminal device or is used to request SRS configuration information.

In some possible designs, the sending module is further configured to send a notification message to a second access network device for measuring, where the notification message is used to notify the second access network device for measuring to stop measuring the SRS.

In some possible designs, the sending module is further configured to send third indication information to the access network device for measuring, where the third indication information is used to indicate the reporting granularity of a measurement quantity of the SRS.

In some possible designs, the sending module is further configured to send fourth indication information to the target access network device, where the fourth indication information is used to indicate that the target access network device stops configuring the SRS for the terminal device.

In another implementation of the implementation scenario:

The processing module is configured to determine periodicity information and/or frequency information of an SRS, where the periodicity information is used to indicate a periodicity of the SRS, and the frequency information is used to indicate a frequency of the SRS or used to indicate a frequency of an SRS carrier. The sending module is configured to send the periodicity information and/or the frequency information to a serving access network device.

In still another implementation of the implementation scenario:

The processing module is configured to determine a reporting granularity of a measurement quantity of an SRS. The sending module is configured to send indication information to an access network device for measuring, where the indication information is used to indicate the reporting granularity of the measurement quantity of the SRS.

In yet another implementation of the implementation scenario:

The processing module is configured to generate indication information, where the indication information is used to indicate to stop configuring an SRS for a terminal device. The sending module is configured to send the indication information to a serving access network device.

In an implementation scenario, the communication apparatus may be the foregoing location management function network element, and the communication apparatus includes a processing module and a transceiver module.

The processing module is configured to determine that a terminal device is handed over to a target cell. The transceiver module is configured to send a first message to a location management function network element, where the first message includes identifier information of the target cell.

In some possible designs, the communication apparatus is a source access network device, and that the processing module is configured to determine that a terminal device is handed over to a target cell may include: When the transceiver module receives a third message from a target access network device, the processing module is configured to determine that the terminal device is handed over to the target cell, where the third message is used to notify the communication apparatus to release a context of the terminal device or is used to request a context of the terminal device from the communication apparatus.

In some possible designs, the communication apparatus may be a target access network device, the transceiver module is further configured to receive identifier information of a location management function network element and information about an SRS that are from a source access network device, where the information about the SRS is used to indicate a transmission characteristic of the SRS.

In some possible designs, the transceiver module is further configured to send first SRS configuration information to the location management function network element, where the first SRS configuration information is used by the terminal device to send the SRS, and the SRS is used to determine a location of the terminal device.

In some possible designs, the transceiver module is further configured to send second indication information to the location management function network element, where the second indication information is used to indicate that the target access network device does not update second SRS configuration information, and the second SRS configuration information is SRS configuration information determined by the source access network device.

In some possible designs, the transceiver module is further configured to receive a request message from the location management function network element, where the request message is used to request the SRS configuration information.

In some possible designs, the communication apparatus may be a mobility management function network element, and that the processing module is configured to determine that a terminal device is handed over to a target cell may include: When the transceiver module receives a fourth message from a target access network device, the processing module is configured to determine that the terminal device is handed over to the target cell, where the fourth message is used to request to hand over a downlink data path of the terminal device to the target access network device.

According to an eighth aspect, a communication apparatus is provided, including a memory and at least one processor. The memory is configured to store computer instructions. When the processor executes the instructions, the communication apparatus is enabled to perform the method according to any one of the foregoing aspects. In some implementations, the communication apparatus may be the location management function network element in the first aspect, the third aspect, the fourth aspect, or the fifth aspect, an apparatus including the location management function network element, or an apparatus included in the location management function network element, for example, a chip. Alternatively, in some other implementations, the communication apparatus may be the communication device in the second aspect, an apparatus including the communication device, or an apparatus included in the communication device.

According to a ninth aspect, a communication apparatus is provided, including an interface circuit and at least one processor. The interface circuit may be a code/data read/write interface circuit, and the interface circuit is configured to: receive computer execution instructions (where the computer execution instructions are stored in a memory, and may be directly read from the memory, or may pass through another component), and transmit the computer execution instructions to the processor. The processor is configured to run the computer execution instructions to perform the method according to any one of the foregoing aspects. In some implementations, the communication apparatus may be the location management function network element in the first aspect, the third aspect, the fourth aspect, or the fifth aspect, an apparatus including the location management function network element, or an apparatus included in the location management function network element, for example, a chip. Alternatively, in some other implementations, the communication apparatus may be the communication device in the second aspect, an apparatus including the communication device, or an apparatus included in the communication device.

According to a tenth aspect, a communication apparatus is provided, including at least one processor. The processor is configured to: be coupled to a memory, and after reading instructions in the memory, perform the method according to any one of the foregoing aspects according to the instructions. In some implementations, the communication apparatus may be the location management function network element in the first aspect, the third aspect, the fourth aspect, or the fifth aspect, an apparatus including the location management function network element, or an apparatus included in the location management function network element, for example, a chip. Alternatively, in some other implementations, the communication apparatus may be the communication device in the second aspect, an apparatus including the communication device, or an apparatus included in the communication device.

According to an eleventh aspect, a computer-readable storage medium is provided. The computer-readable storage medium stores instructions. When the instructions are run on a communication apparatus, the communication apparatus is enabled to perform the method according to any one of the foregoing aspects. In some implementations, the communication apparatus may be the location management function network element in the first aspect, the third aspect, the fourth aspect, or the fifth aspect, an apparatus including the location management function network element, or an apparatus included in the location management function network element, for example, a chip. Alternatively, in some other implementations, the communication apparatus may be the communication device in the second aspect, an apparatus including the communication device, or an apparatus included in the communication device.

According to a twelfth aspect, a computer program product including instructions is provided. When the computer program product is run on a communication apparatus, the communication apparatus is enabled to perform the method according to any one of the foregoing aspects. In some implementations, the communication apparatus may be the location management function network element in the first aspect, the third aspect, the fourth aspect, or the fifth aspect, an apparatus including the location management function network element, or an apparatus included in the location management function network element, for example, a chip. Alternatively, in some other implementations, the communication apparatus may be the communication device in the second aspect, an apparatus including the communication device, or an apparatus included in the communication device.

According to a thirteenth aspect, a communication apparatus (where for example, the communication apparatus may be a chip or a chip system) is provided. The communication apparatus includes at least one processor, configured to implement a function in any one of the foregoing aspects. In a possible design, the communication apparatus further includes a memory. The memory is configured to store program instructions and/or data that are necessary. When the communication apparatus is a chip system, the communication apparatus may include a chip, or may include a chip and another discrete component.

According to a fourteenth aspect, a communication system is provided. The communication system includes the location management function network element according to the foregoing aspect and the communication device according to the foregoing aspect.

The communication device is configured to: determine that a terminal device is handed over to a target cell; and send a first message to the location management function network element, where the first message includes identifier information of the target cell. The location management function network element is configured to receive the first message from the communication device. The location management function network element is further configured to send a second message to an access network device for measuring, where the second message is used to request to measure a sounding reference signal SRS sent by the terminal device, and the SRS is used to determine a location of the terminal device after the terminal device is handed over to the target cell.

For technical effects brought by any design manner in the sixth aspect to the fourteenth aspect, refer to technical effects brought by different design manners in the first aspect, the second aspect, the third aspect, the fourth aspect, or the fifth aspect. Details are not described herein again.

These aspects or other aspects in this application may be clearer and more intelligible in descriptions in the following embodiments.

DESCRIPTION OF EMBODIMENTS

The following describes technical solutions in embodiments of this application with reference to the accompanying drawings in the embodiments of this application. In the descriptions of this application, "I" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more. "At least one item (piece) of the following" or a similar expression thereof means any combination of these items, including a singular item (piece) or any combination of plural items (pieces). For example, at least one of a, b, or c may indicate: a, b, c, a and b, a and c, b and c, or a, b, and c, where a, b, and c may be singular or plural. In addition, for convenience of clear description of the technical solutions in the embodiments of this application, in the embodiments of this application, terms such as "first" and "second" are used to distinguish between same objects or similar objects whose functions and purposes are basically the same. A person skilled in the art may understand that the terms, such as "first" and "second", are not intended to limit a quantity or an execution sequence; and the terms, such as "first" and "second", do not indicate a definite difference.

In addition, a positioning request processing method provided in the embodiments of this application is applicable to a plurality of system architectures. A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of a new service scenario, the technical solutions provided in the embodiments of this application are also applicable to similar technical problems.

Figure 1A:
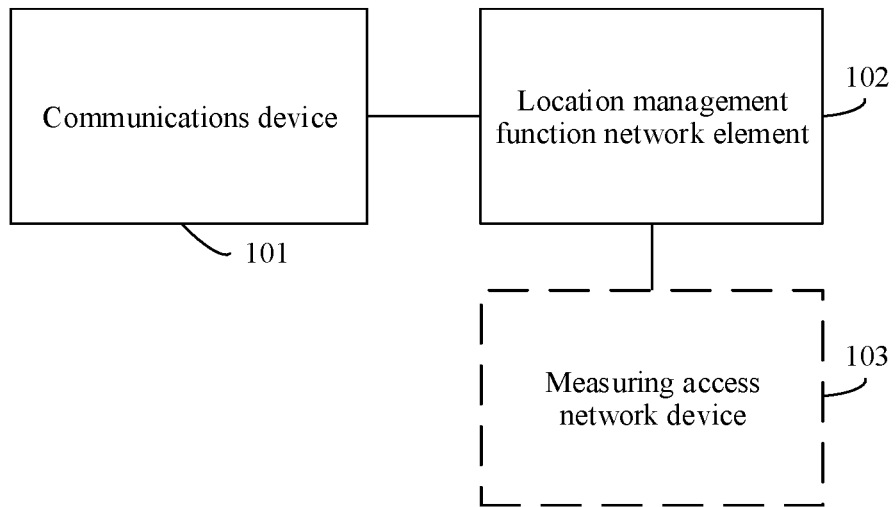
FIG. 1A is a schematic architectural diagram of a communication system according to an embodiment of this application.

FIG. 1A shows a communication system 10 to which an embodiment of this application is applicable. The communication system 10 includes a communication device 101 and a location management function network element 102. Optionally, the communication system 10 may further include an access network device for measuring 103.

The communication device 101 and the location management function network element 102 may directly communicate with each other, or may communicate with each other through forwarding by another device. This is not specifically limited in this embodiment of this application.

The communication device 101 may be one of a source access network device, a target access network device, or a mobility management function network element. The access network device for measuring is an access network device that can measure an SRS of a terminal device according to a request of the location management function network element. A name of the access network device for measuring is not specifically limited in this embodiment. In an actual application, the access network device for measuring may have another name.

In this embodiment of this application:

The communication device 101 is configured to: determine that a terminal device is handed over to a target cell; and send a first message to the location management function network element 102, where the first message includes identifier information of the target cell.

The location management function network element 102 is configured to receive the first message from the communication device.

The location management function network element 102 is further configured to send a second message to the access network device for measuring 103, where the second message is used to request to measure a sounding reference signal SRS sent by the terminal device, and the SRS is used to determine a location of the terminal device after the terminal device is handed over to the target cell.

In the communication system provided in this embodiment of this application, after the terminal device is handed over, the communication device may send the identifier information of the target cell to the location management function network element, so that the location management function network element perceives the handover of the terminal device; and send the second message to the access network device for measuring based on an identifier of the target cell, to request the access network device for measuring to measure the SRS of the terminal device, so that the location management function network element can finally determine, based on a measurement result reported by the access network device for measuring, the location of the terminal device after the terminal device is handed over to the target cell, thereby completing positioning, maintaining positioning continuity, and improving a positioning success rate.

Figure 1B:
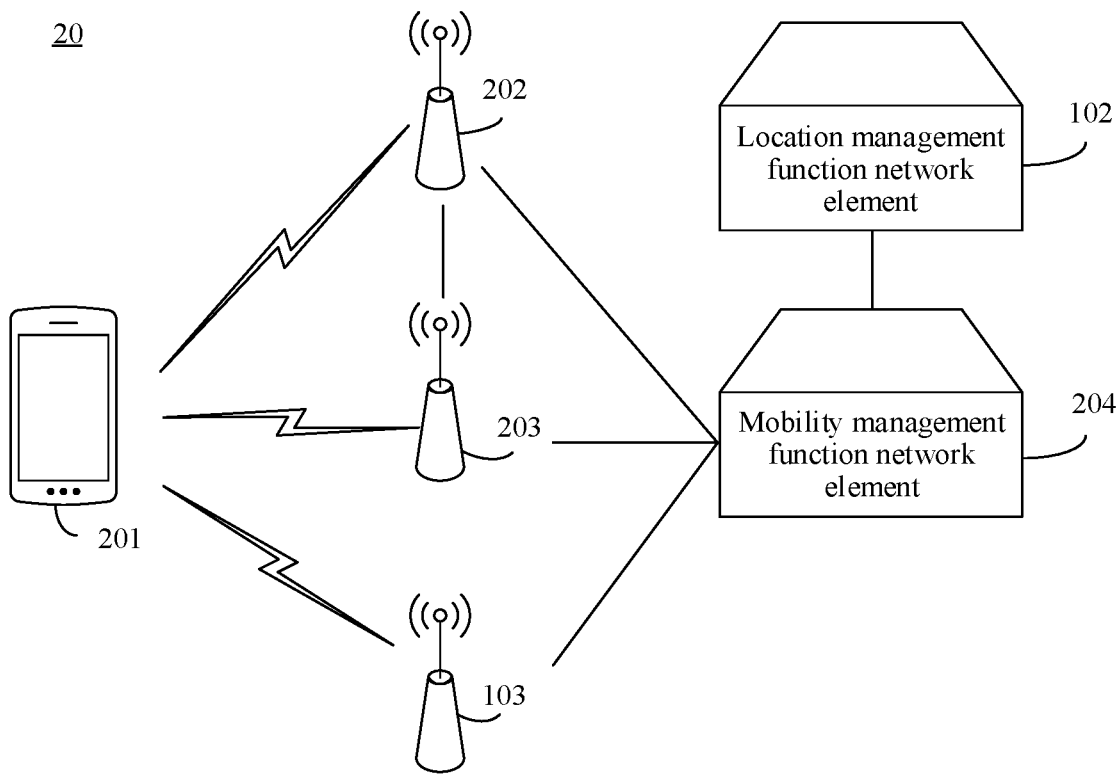
FIG. 1B is a schematic architectural diagram of another communication system according to an embodiment of this application.

FIG. 1B shows another possible communication system 20 to which an embodiment of this application is applicable. In addition to the location management function network element 102 and the access network device for measuring 103 in FIG. 1A, the communication system 20 may further include a terminal device 201, a source access network device 202, a target access network device 203, and a mobility management function network element 204. The source access network device 202 is an access network device to which a source cell belongs, and the target access network device 203 is an access network device to which a target cell belongs.

In this application embodiment, an example in which the terminal device maintains a connection to the source access network device 202 before handover and maintains a connection to the target access network device 203 after the handover.

Any one of the source access network device 202, the target access network device 203, and the mobility management function network element 204 may be used as the communication device 101 in FIG. 1A.

In this embodiment of this application:

In addition to the foregoing functions, the location management function network element 102 may be further configured to: manage a positioning request of a positioning service, allocate a positioning resource, obtain location information of a terminal device, return the location information to a related network element, and the like. In a 5G communication system, a network element or an entity corresponding to the location management function network element 102 may be a location management function (LMF) network element in a 5G network architecture. Nlmf is a service-based interface provided by the LMF network element, and the LMF network element may communicate with another network function through Nlmf. In a future communication system such as a 6th generation (6G) communication system, the location management function network element 102 may still be an LMF network element, or the location management function network element 102 has another name. This is not limited in the embodiments of this application.

The terminal device 201 may be a device configured to implement a wireless communication function, for example, a terminal or a chip that can be used in a terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (virtual reality, VR) terminal device, an augmented reality (AR) terminal device, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, or the like.

The mobility management function network element 204 may be configured to perform mobility management in a mobile network, for example, user location update, registration of a user with a network, and user handover. In the 5G communication system, a network element or an entity corresponding to the mobility management function network element 204 may be an access and mobility management function (AMF) network element in the 5G network architecture. Namf is a service-based interface provided by the AMF network element, and the AMF network element may communicate with another network function through Namf. In a future communication system such as a 6th generation (6G) communication system, the mobility management function network element 204 may still be the AMF network element, or the mobility management function network element 204 has another name. This is not limited in the embodiments of this application.

The access network device (including the source access network device 202, the target access network device 203, and the access network device for measuring 103) is a device that provides a wireless communication function for the terminal device. For example, the access network device includes, but is not limited to, a next-generation base station (gnodeB, gNB) in 5G, an evolved nodeB (eNB), a radio network controller (RNC), a NodeB (NB), a base station controller (BSC), a base transceiver station (BTS), a home eNodeB (for example, a home evolved nodeB or a home node B, HNB), a baseband unit (BBU), a transmitting point (TP), a mobile switching center, and the like. Optionally, the base station in the embodiments of this application may include base stations in various forms, for example, a macro base station, a micro base station (which is also referred to as a small cell), and an access point. This is not specifically limited in the embodiments of this application.

In a possible manner, the access network device in the embodiments of this application may include one or more transmission reception points (transmitting and receiving point, TRP).

In a possible manner, the access network device in the embodiments of this application may include a central unit (CU) and one or more distributed units (distributed unit, DU).

It may be understood that the access network device is divided into the CU and the DU by logical function. The CU and the DU may be physically separated, or may be deployed together. This is not specifically limited in the embodiments of this application. The CU and the DU may be connected through an interface, for example, an F1 interface. The CU and the DU may be divided based on protocol layers of a wireless network. For example, functions of a radio resource control (RRC) layer, a service data adaptation protocol (SDAP) layer, and a packet data convergence protocol (PDCP) layer are set in the CU, and functions of a radio link control (RLC) layer, a media access control (MAC) layer, a physical (PHY) layer, and the like are set in the DU. It may be understood that, division into processing functions of the CU and the DU based on the protocol layers is merely an example, and the processing functions of the CU and the DU may alternatively be divided in another manner. This is not specifically limited in the embodiments of this application.

Optionally, the CU may include a CU control plane (CU-CP) and a CU user plane (CU-UP). It may be understood that the CU is divided into the CU-CP and the CU-UP by logical function. The CU-CP and the CU-UP may be divided based on protocol layers of a wireless network. For example, a function of the RRC protocol layer and a function that is of the PDCP protocol layer and that is corresponding to a signaling radio bearer (signal radio bearer, SRB) are set in the CU-CP, and a function that is of the PDCP protocol layer and that is corresponding to a data radio bearer (DRB) is set in the CU-UP. In addition, a function of the SDAP protocol layer may also be set in the CU-UP.

Optionally, the TRP may be deployed in the DU. That is, the TRP is a component in the DU.

Optionally, the communication system shown in FIG. 1A or FIG. 1B may be applied to a current 4G network, 4.5G network, 5G network, and another future network. This is not specifically limited in the embodiments of this application.

Figure 2:
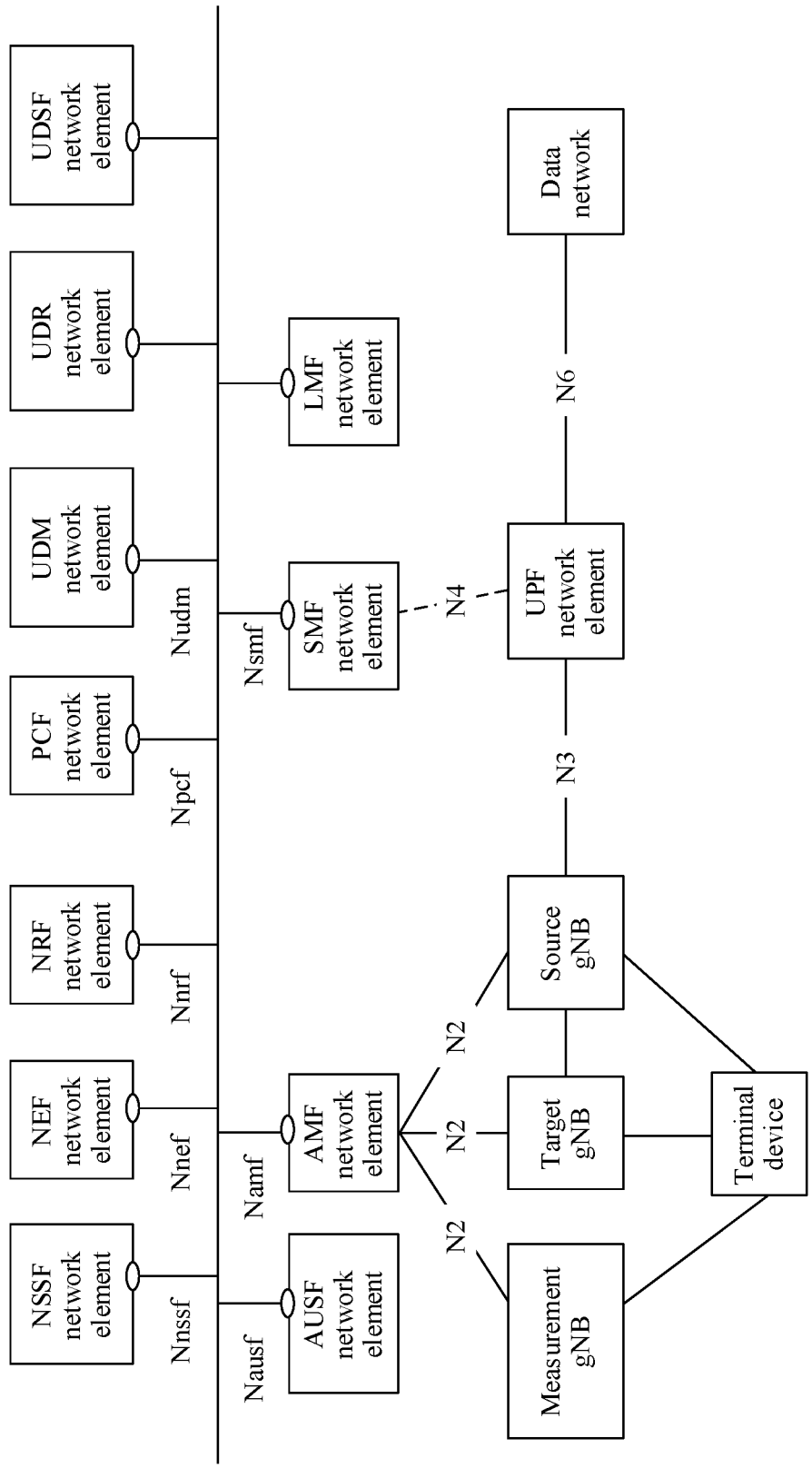
FIG. 2 is a schematic architectural diagram of still another communication system according to an embodiment of this application.

If the communication system shown in FIG. 1A or FIG. 1B is applied to the current 5G network, as shown in FIG. 2, the network architecture may include the foregoing terminal device, source gNB, target gNB, measuring gNB, AMF network element, and LMF network element. In addition, the communication system may further include a session management function (SMF) network element, a user plane function (UPF) network element, a unified data management (UDM) network element, a network exposure function (NEF) network element, an authentication server function (AUSF) network element, a network slice selection function (NSSF) network element, a network repository function (NRF) network element, a policy control function (PCF) network element, a unified data repository (UDR) network element, an unstructured data storage function (UDSF), and the like. This is not specifically limited in the embodiments of this application.

It may be understood that the terminal device in FIG. 2 may communicate with the AMF network element through an N1 interface, and the N1 interface may be understood as a reference point between the terminal device and the AMF network element. The measuring gNB and the target gNB may also communicate with the UPF network element through an N3 interface.

An N2 interface in FIG. 2 is a reference point between a gNB and the AMF network element, and is configured to send a non-access stratum (NAS) message and a next generation application protocol (NGAP) message, and the like. The N3 interface is a reference point between the gNB and the UPF network element, and is configured to transmit user plane data and the like. An N4 interface is a reference point between the SMF and the UPF, and is configured to transmit information such as tunnel identifier information of an N3 connection, data buffer indication information, and a downlink data notification message. An N6 interface is a reference point between the UPF network element and a data network (DN), and is configured to transmit the user plane data and the like.

In addition, control plane network elements, such as the AUSF network element, the AMF network element, the SMF network element, the LMF network element, the NSSF network element, the NEF network element, the NRF network element, the PCF network element, the UDM network element, the UDR network element, or the UDSF network element shown in FIG. 2, may also interact with each other through a service-oriented interface. For example, an external service-oriented interface provided by the AUSF network element may be Nausf; an external service-oriented interface provided by the AMF network element may be Namf; an external service-oriented interface provided by the SMF network element may be Nsmf; an external service-oriented interface provided by the NSSG network element may be Nnssf; an external service-oriented interface provided by the NEF network element may be Nnef; an external service-oriented interface provided by the NRF network element may be Nnrf; an external service-oriented interface provided by the PCF network element may be Npcf; and an external service-oriented interface provided by the UDM network element may be Nudm. For related descriptions, refer to a diagram of a 5G system architecture in the 23.501 standard. Details are not described herein.

It may be understood that the foregoing network elements or functions may be network elements in a hardware device, may be software functions running on dedicated hardware, or may be virtualized functions instantiated on a platform (for example, a cloud platform). One or more services may be obtained through division based on the foregoing network elements or functions. Further, a service independent of a network function may exist. In this application, instances of the foregoing functions, an instance of a service included in the foregoing functions, or a service instance independent of the network function may be referred to as a service instance.

Figure 3:
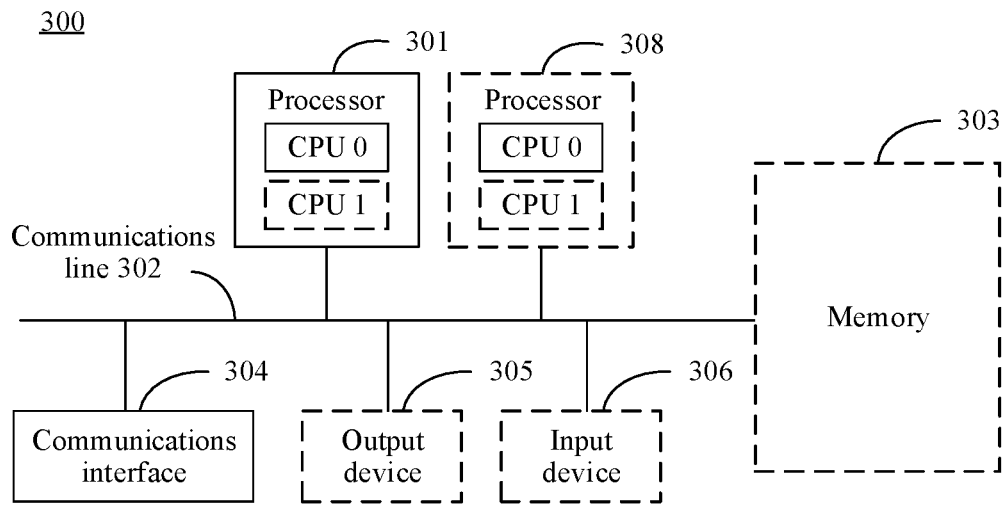
FIG. 3 is a schematic architectural diagram of a communication apparatus according to an embodiment of this application.

For example, the foregoing network elements or functions may be implemented by using a communication apparatus in FIG. 3. FIG. 3 is a schematic diagram of a hardware structure of a communication apparatus 300 according to an embodiment of this application. The communication apparatus 300 includes a processor 301, a communication line 302, and at least one communication interface (where FIG. 3 is described merely by using an example in which the communication apparatus includes a communication interface 304). Optionally, the communication apparatus may further include a memory 303.

The processor 301 may be a general-purpose central processing unit (CPU), a microprocessor, an application-specific integrated circuit (ASIC), or one or more integrated circuits configured to control program execution of the solutions of this application.

The communication line 302 may include a path for transmitting information between the foregoing components.

The communication interface 304 is applicable to any apparatus such as a transceiver, and is configured to communicate with another device or a communication network such as an Ethernet, a radio access network (RAN), or a wireless local area network (WLAN).

The memory 303 may be a read-only memory (ROM) or another type of static storage device that can store static information and an instruction, or a random access memory (RAM) or another type of dynamic storage device that can store information and an instruction, or may also be an electrically erasable programmable read-only memory (EEPROM), a compact disc read-only memory (CD-ROM) or another compact disc storage, an optical disc storage (including a compact disc, a laser disc, an optical disc, a digital versatile disc, a blu-ray optical disc, or the like), a magnetic disk storage medium or another magnetic storage device, or any other computer-accessible medium that can be used to carry or store expected program code in an instruction or a data structure form, but is not limited thereto. The memory may exist independently, and is connected to the processor through the communication line 302. The memory may alternatively be integrated with the processor.

The memory 303 is configured to store computer execution instructions for executing the solutions of this application, and the processor 301 controls the execution. The processor 301 is configured to execute the computer execution instructions stored in the memory 303, to implement a communication method provided in the following embodiments of this application.

Optionally, the computer execution instructions in this embodiment of this application may also be referred to as application program code. This is not specifically limited in this embodiment of this application.

During specific implementation, in an embodiment, the processor 301 may include one or more CPUs, for example, a CPU 0 and a CPU 1 in FIG. 3.

During specific implementation, in an embodiment, the communication apparatus 300 may include a plurality of processors, for example, a processor 301 and a processor 308 in FIG. 3. Each of the processors may be a single-core (single-CPU) processor or a multi-core (multi-CPU) processor. The processor herein may be one or more devices, circuits, and/or processing cores for processing data (for example, computer program instructions).

During specific implementation, in an embodiment, the communication apparatus 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive an input of a user in a plurality of manners. For example, the input device 306 may be a mouse, a keyboard, a touchscreen device, or a sensing device.

The foregoing communication apparatus 300 may be a general-purpose device or a special-purpose device.

With reference to FIG. 1A to FIG. 3, the following describes in detail the communication method provided in the embodiments of this application by using specific embodiments.

It should be noted that in the following embodiments of this application, names of messages between devices (or network elements), names of parameters in messages, or the like are merely examples, and may be other names in a specific implementation. This is not specifically limited in the embodiments of this application.

In the following embodiments of this application, it is assumed that a location management function network element needs to obtain a location of a terminal device before the terminal device is handed over to a target cell, and the location management function network element has not successfully obtained the location of the terminal device until the terminal device successfully accesses the target cell. Alternatively, the location management function network element needs to periodically and continuously obtain the location of the terminal device, and has not ended the periodic positioning until the terminal device successfully accesses the target cell.

It may be understood that the foregoing assumption is merely descriptions of an example of an applicable scenario of the embodiments of this application, and does not constitute any limitation on this application.

Figure 4:
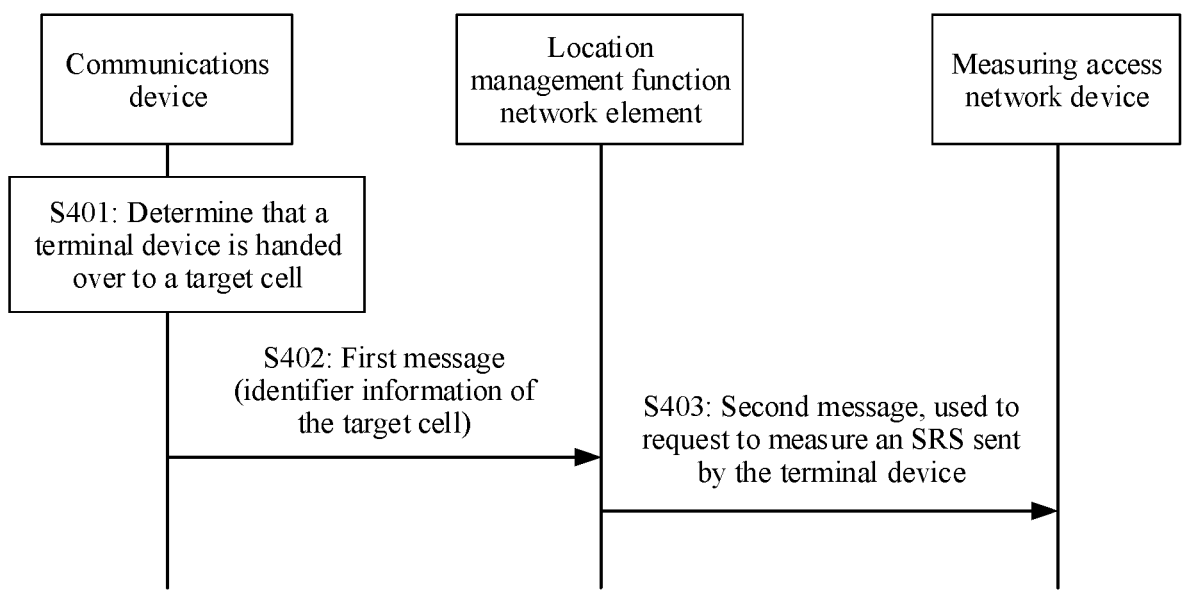
FIG. 4 is a schematic flowchart 1 of a communication method according to an embodiment of this application.

FIG. 4 shows a communication method according to an embodiment of this application. The communication method may be applied to the communication system shown in FIG. 1A. The communication method includes the following steps.

S401: A communication device determines that a terminal device is handed over to a target cell.

Optionally, that a terminal device is handed over to a target cell may refer to: The terminal device is successfully connected to the target cell, the terminal device is successfully handed over to the target cell, or the terminal device completes handover from a source cell to the target cell.

The communication device may be one of a source access network device, a target access network device, or a mobility management function network element. The target access network device is an access network device to which the target cell belongs. In other words, the target access network device is an access network device that manages the target cell. The source access network device is a serving access network device before the terminal device is handed over to the target cell, and the mobility management function network element is a mobility management function network element serving the terminal device.

It may be understood that, in the handover process, the target access network device may send related information of the target cell to the source access network device and the mobility management function network element. For example, the target access network device sends the related information of the target cell to the source access network device in a handover request acknowledgment (Handover Request ACK) message, or sends the related information of the target cell to the mobility management network element in a path switch request message.

Optionally, the related information of the target cell may include, for example, identifier information of the target cell, system information of the target cell, an identifier of the terminal device in the target cell, and a random access channel (RACH) resource.

S402: The communication device sends a first message to a location management function network element. Correspondingly, the location management function network element receives the first message from the communication device.

The first message is used to indicate that the terminal device is handed over to the target cell.

The first message includes the identifier information of the target cell. The identifier information of the target cell may be, for example, a CGI of the target cell, a frequency and physical cell identifier (PCI) of the target cell, or another identifier that may be used to uniquely identify the target cell. This is not specifically limited in this embodiment of this application.

Optionally, the first message may further include first indication information, and the first indication information is used to indicate that the terminal device is handed over.

S403: The location management function network element sends a second message to the access network device for measuring. Correspondingly, the access network device for measuring receives the second message from the location management function network element.

The second message is used to request to measure an SRS sent by the terminal device, and the SRS is used to determine a location of the terminal device after the terminal device is handed over to the target cell.

It should be noted that, in step S403, a quantity of access network device for measuring is not limited to 1. In other words, the location management function network element may send the second message to a plurality of access network device for measuring.

Optionally, after receiving the first message, the location management function network element may determine (or select) an access network device for measuring based on the identifier information of the target cell that is included in the first message. After determining the access network device for measuring, the location management function network element sends the second message to the access network device for measuring.

Optionally, the access network device for measuring determined by the location management function network element based on the identifier information of the target cell may include at least one of the following: an access network device to which a neighboring cell of the target cell belongs, or an access network device to which the target cell belongs, namely, the target access network device.

Based on this solution, after the terminal device is handed over, the communication device may send the identifier information of the target cell to the location management function network element, so that the location management function network element perceives the handover of the terminal device; and send the second message to the access network device for measuring based on the identifier of the target cell, to request the access network device for measuring to measure the SRS of the terminal device, so that the location management function network element can finally determine, based on a measurement result reported by the access network device for measuring, the location of the terminal device after the terminal device is handed over to the target cell, thereby completing positioning, maintaining positioning continuity, and improving a positioning success rate.

The method shown in FIG. 4 is described in detail below by using the foregoing communication device as a source access network device, a target access network device, and a mobility management function network element separately. In this case, the communication method provided by this application may be applied to the communication system shown in FIG. 1B or FIG. 2.

Figure 5A:
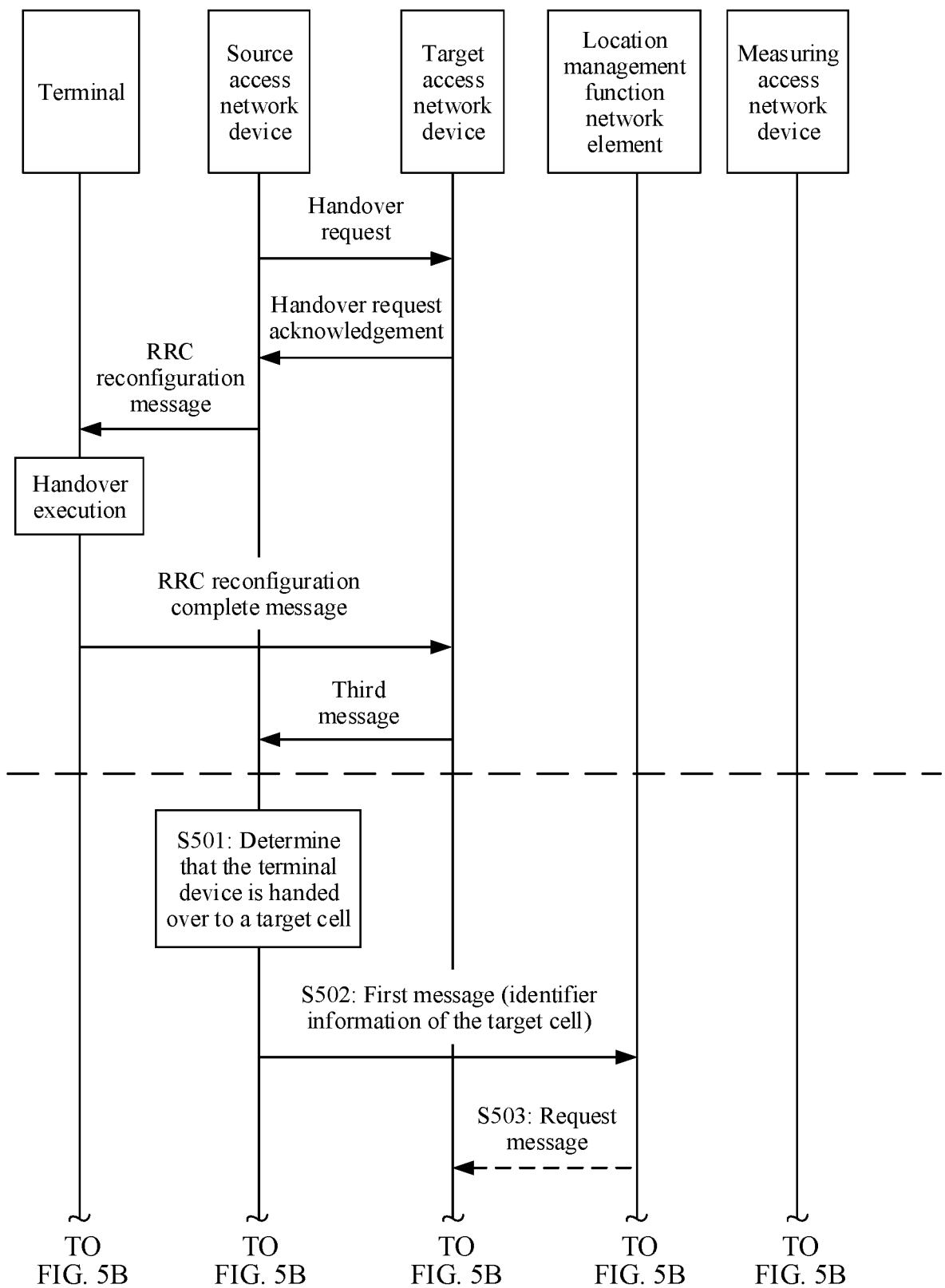
FIG. 5A and FIG. 5B are a schematic flowchart of a communication method in a scenario in which a communication device is a source access network device according to an embodiment of this application.
Figure 5B:
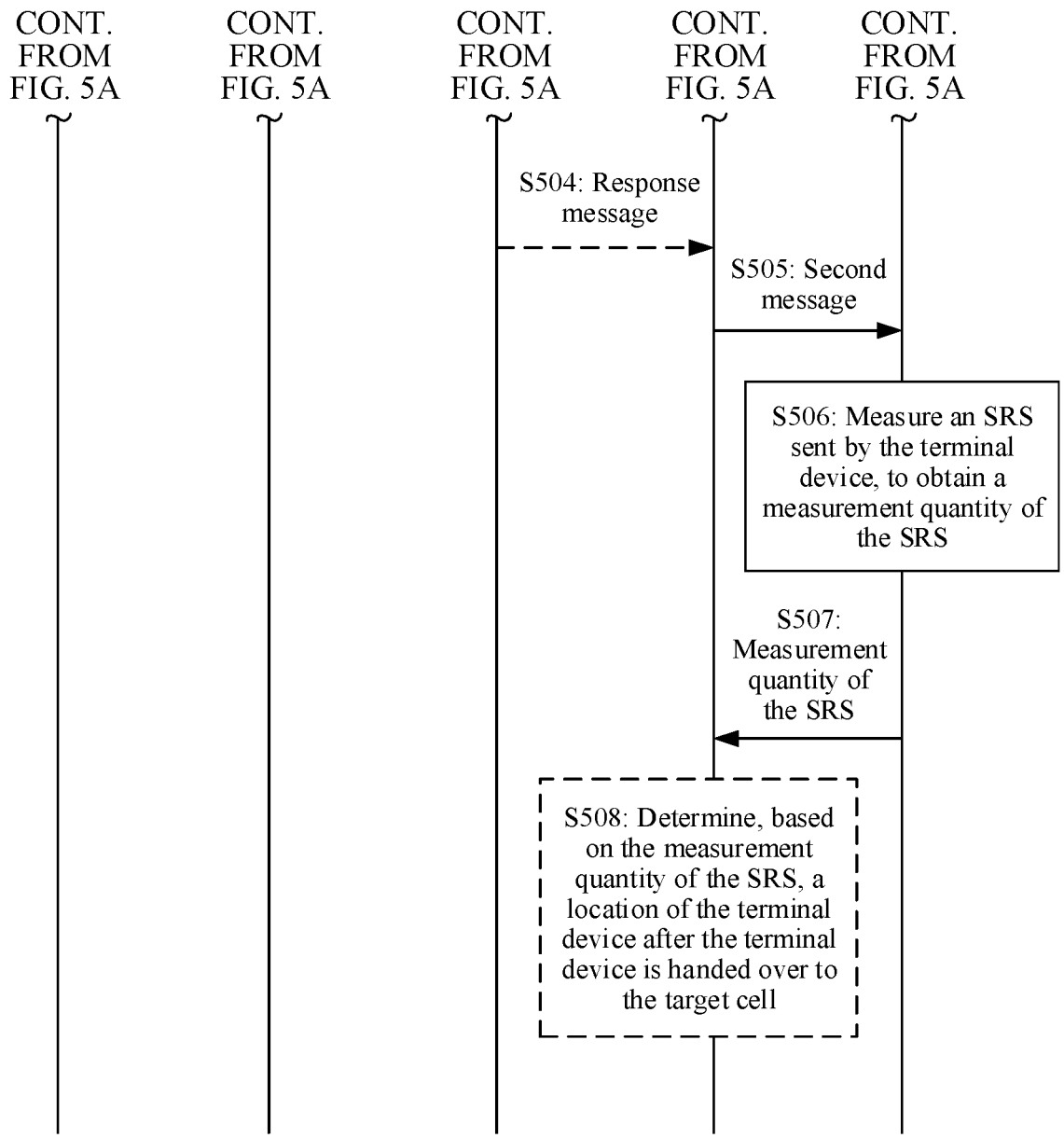

First, when the foregoing communication device is a source access network device, as shown in FIG. 5A and FIG. 5B, the communication method may include the following steps.

S501: The source access network device determines that a terminal device is handed over to a target cell.

It may be understood that before step S501, the terminal device is handed over. An example of some steps in a handover procedure is shown before step S501 in FIG. 5A, and the handover procedure is not specifically limited in this embodiment of this application.

Optionally, step S501 may also be understood as follows: The source access network device determines that the terminal device is successfully connected to the target cell, the source access network device determines that the terminal device is successfully handed over to the target cell, or the source access network device determines that the terminal device is successfully handed over from a source cell to the target cell.

Optionally, that the source access network device determines that a terminal device is handed over to a target cell may include: When the source access network device receives a third message from a target access network device, the source access network device determines that the terminal device is handed over to the target cell.

Optionally, in different implementations of this embodiment of this application, the third message may have different functions. Examples are as follows:

In a possible implementation, the third message is used to notify the source access network device to release a context of the terminal device. For example, the third message is a UE context release message. In another possible implementation, the third message is used to request a context of the terminal device from the source access network device. For example, the third message is a retrieve UE context request message.

Optionally, in this possible implementation, the source access network device may receive the third message in the following scenario: The terminal device fails to access a first target cell specified by the source access network device. That is, the terminal device fails to be handed over to the first target cell. Then, the terminal device initiates reestablishment to a second target cell, so that an access network device to which the second target cell belongs sends a retrieve UE context request to the source access network device, to obtain the context of the terminal device.

It may be understood that, in this possible implementation, the access network device to which the second target cell belongs is the target access network device in this embodiment of this application.

Optionally, in this scenario, the third message may include identifier information of the second target cell, to indicate a serving cell to the source access network device after the terminal device is handed over. After receiving the third message, the source access network device may send the context of the terminal device to the access network device to which the second target cell belongs. In addition, the source access network device may further release the context of the terminal device.

Optionally, a scenario in which the source access network device receives the third message is not specifically limited in this embodiment of this application, and the source access network device may also receive the third message in another scenario.

S502: The source access network device sends a first message to a location management function network element. Correspondingly, the location management function network element receives the first message from the source access network device.

For a function of the first message and information included in the first message, refer to step S402. Details are not described herein again.

Optionally, in different implementation scenarios of this embodiment of this application, the first message may be of different types, or may have different message names. Examples are as follows:

In a possible implementation, the first message may be an existing message, for example, a positioning information request message (Positioning Information Update) message. In this implementation, the first message may include identifier information of the target cell and first indication information.

In another possible implementation, the first message may be a newly defined message, for example, a positioning information terminate (Positioning Information Terminate) message. In this implementation, the first message may include identifier information of the target cell and first indication information.

In addition, in this embodiment of this application, the positioning information terminate message may be used to notify the location management function network element that a transmitter of the message no longer updates an SRS configuration for the location management function network element. In this case, the identifier information of the target cell and the first indication information that are included in the positioning information terminate message are not limited. That is, content included in the positioning information terminate message in this scenario is not specifically limited in this embodiment of this application.

It should be noted that, that the source access network device sends the positioning information terminate message to the location management function network element after the terminal device is handed over to the target cell is not limited in this application, and another access network device may also send the positioning information terminate message to the location management function network element in another case.

For example, when determining not to configure the terminal device to send the SRS for positioning, a serving access network device may send the positioning information terminate message to the location management function network element; or when determining not to update the SRS configuration, a serving access network device sends the positioning information terminate message to the location management function network element, to notify the location management function network element that the serving access network device no longer updates the SRS configuration for the location management function network element.

It may be understood that the serving access network device in this embodiment of this application is an access network device to which a serving cell of the terminal device belongs.

In still another possible implementation, the first message may be a newly defined dedicated message, and is used to indicate, to the location management function network element, that the terminal device is handed over, for example, a positioning information indication message. In this implementation, the first message may include identifier information of the target cell. In addition, the first message may not include first indication information.

It may be understood that the name of the newly defined message is merely an example for description. In actual application, the newly defined message may have another name. This is not specifically limited in this embodiment of this application.

With reference to steps S501 and S502, the source access network device sends the first message to the location management function network element after determining that the terminal device is handed over to the target cell.

Optionally, in an implementation scenario of this application, the source access network device may alternatively send the first message to the location management function network element after receiving a handover request acknowledgment (Handover request ACK) message from the target access network device. That is, step S501 may be replaced with: The source access network device determines that the handover request acknowledgment (Handover request ACK) message from the target access network device is received, or the source access network device determines that the target access network device allows handover of the terminal device.

S503: The location management function network element sends a request message to the target access network device. Correspondingly, the target access network device receives the request message from the location management function network element.

The request message is used to request SRS configuration information from the target access network device. Or the request message is used to request the target access network device to configure an SRS for the terminal device. The request message may be, for example, a positioning information request message.

In this embodiment of this application, the SRS configuration information is used to configure an SRS for the terminal device. In other words, the SRS configuration information is used by the terminal device to send an SRS. After receiving the SRS configuration information, the terminal device may send the SRS at a corresponding time-frequency location based on time-frequency domain resource information included in the SRS configuration information. The SRS configuration information may include but is not limited to: time domain resource configuration information, frequency domain resource configuration information, a quantity of antenna ports for sending the SRS, periodicity information, and the like. The time domain resource configuration information may include, for example, a location of a start symbol and a quantity of symbols. The frequency domain resource configuration information may include, for example, a frequency domain location and a frequency offset. The periodicity information is used to indicate a sending periodicity of the SRS.

Optionally, the request message may include periodicity information of the SRS and/or frequency information of the SRS.

Optionally, the periodicity information is used to indicate a periodicity of the SRS, and the periodicity of the SRS may be understood as the periodicity of sending the SRS by the terminal device.

Based on this solution, the location management function network element includes the periodicity information in the request message, to recommend the periodicity of the SRS to the target access network device, so that the target access network device can configure, based on the periodicity recommended by the location management function network element, the periodicity of sending the SRS by the terminal device. Therefore, the periodicity that is of the SRS and that is configured by the target access network device is close to or equal to a periodicity that is of the SRS and that is expected by the location management function network element. In addition, when recommending the periodicity of the SRS, the location management function network element may select an appropriate periodicity based on a delay requirement of a current positioning service, and send the periodicity to the target access network device, to control a measurement delay of the SRS by using the sending periodicity of the SRS, thereby controlling a delay of the positioning service and meeting a requirement of the positioning service.

Optionally, the frequency information is used to indicate a frequency of the SRS or is used to indicate a frequency of an SRS carrier. For example, the frequency may be represented by an absolute radio frequency channel number (ARFCN).

Optionally, the frequency of the SRS may be a center frequency of bandwidth occupied by the SRS, or may be a start frequency of bandwidth occupied by the SRS. The bandwidth occupied by the SRS may also be understood as transmission bandwidth of the SRS.

Optionally, the frequency of the SRS carrier may be a frequency of a carrier center of the carrier, or may be a frequency of a point A of the carrier, or the like. Optionally, the bandwidth occupied by the SRS may be a part or all of bandwidth of the SRS carrier.

Based on this solution, the location management function network element may select a access network device for measuring, and recommend (or indicate) a frequency used for the SRS to the target access network device based on the frequency supported by the access network device for measuring selected by the location management function network element, so that the target access network device may configure the SRS for the terminal device according to the recommendation of the location management function network element. Therefore, a problem that the access network device for measuring selected by the location management function network element cannot measure the SRS because the target access network device configures the SRS at another frequency is avoided, and an SRS measurement success rate is improved, so that a positioning success rate is improved.

It may be understood that the location management function network element may alternatively send the periodicity information of the SRS and/or the frequency information of the SRS to the target access network device via another message. This is not specifically limited in this application.

S504: The target access network device sends a response message to the location management function network element. Correspondingly, the location management function network element receives the response message from the target access network device.

Optionally, the response message may be, for example, a positioning information response message.

Optionally, after receiving the request message, the target access network device may determine first SRS configuration information, and include the first SRS configuration information in the response message. The first SRS configuration information is used by the terminal device to send the SRS, and the SRS is used to determine a location of the terminal device after the terminal device is handed over to the target cell. In addition, the target access network device may send the first SRS configuration information to the terminal device, so that the terminal device sends the SRS based on the first SRS configuration information.

Optionally, when the request message includes the periodicity information of the SRS, the target access network device may determine the first SRS configuration information based on the periodicity information of the SRS. For example, the first SRS configuration information includes the periodicity indicated by the periodicity information. When the request message includes the frequency information of the SRS, the target access network device may determine the first SRS configuration information based on the frequency information. For example, the first SRS configuration information includes the frequency indicated by the frequency information.

Alternatively, after receiving the request message, the target access network device may continue to use second SRS configuration information, where the second SRS configuration information is SRS configuration information determined by the source access network device before the terminal device is handed over to the target cell, that is, an SRS configuration configured by the source access network device for the terminal device. In this case, the response message may include second indication information, and the second indication information is used to indicate that the target access network device does not update the second SRS configuration information. Alternatively, the response message may include the second SRS configuration information. That is, the target access network device returns the SRS configuration of the source access network device to the location management function network element. Alternatively, the response message may not carry the second indication information and the second SRS configuration information. In this scenario, the location management function network element considers by default that the target access network device does not update the SRS configuration of the source access network device.

It may be understood that, if the target access network device sends the first SRS configuration information to the terminal device, after receiving the first SRS configuration information, the terminal device sends the SRS based on the first SRS configuration information, so that the access network device for measuring performs measurement. If the target access network device continues to use the second SRS configuration information, the terminal device sends the SRS based on the second SRS configuration information.

It should be noted that step S503 and step S504 are optional steps. That is, step S503 and step S504 may not be performed. In this case, it is considered by default that the target access network device continues to use the second SRS configuration information.

S505: The location management function network element sends a second message to the access network device for measuring. Correspondingly, the access network device for measuring receives the second message from the location management function network element.

For a function of the second message and related descriptions of the access network device for measuring, refer to step S403. Details are not described herein again.

Optionally, when the access network device for measuring includes one or more TRPs, the location management function network element further sends, to the access network device for measuring, information about the TRPs, for example, a TRP list, of the access network device for measuring. The information about the TRPs is used to indicate a TRP that is in the access network device for measuring and that is configured to measure the SRS sent by the terminal device.

For example, the access network device for measuring includes an access network device for measuring 1, and the access network device for measuring 1 includes a TRP 1, a TRP 2, a TRP 3, and a TRP 4. If the location management function network element determines that TRPs that are in the access network device for measuring 1 and that may be configured to measure the SRS sent by the terminal device are the TRP 1 and the TRP 2, the TRP list may include identifiers of the TRP 1 and the TPR 2, to indicate that the TRP 1 and the TRP 2 measure the SRS sent by the terminal device.

Optionally, the location management function network element may send the information about the TRPs of the access network device for measuring to the access network device for measuring via the second message. That is, the second message includes the information about the TRPs of the access network device for measuring. Alternatively, the information about the TRPs of the access network device for measuring may be sent to the access network device for measuring via a message other than the second message. This is not specifically limited in this embodiment of this application.

Based on this solution, the TRP that measures the SRS sent by the terminal device may be indicated to the access network device for measuring, to avoid a waste of power consumption and resources of the access network device for measuring when the access network device for measuring uses all TRPs to measure the SRS.

Optionally, the access network device for measuring in step S505 may have the following cases.

In a possible case, the access network device for measuring includes a first access network device for measuring, and the first access network device for measuring is an access network device that does not measure the SRS of the terminal device before the terminal device is handed over to the target cell. In other words, before the terminal device is handed over to the target cell, the access network device for measuring determined by the location management function network element does not include the first access network device for measuring.

For example, before the terminal device is handed over to the target cell, access network devices for measuring are an access network device for measuring 1 and an access network device for measuring 2. After the terminal device is handed over to the target cell, access network devices for measuring are the access network device for measuring 1, an access network device for measuring 3, and an access network device for measuring 4. The first access network device for measuring includes the access network device for measuring 3 and the access network device for measuring 4.

In this scenario, the second message sent by the location management function network element to the first access network device for measuring may be a measurement request message.

When the target access network device continues to use the second SRS configuration information, the second message may include the second SRS configuration information. Alternatively, when the target access network device does not continue to use the second SRS configuration, that is, when the target access network device determines the first SRS configuration information, the second message may include the first SRS configuration information.

Certainly, the location management function network element may alternatively send the second SRS configuration information or the first SRS configuration information to the first access network device for measuring via a message other than the second message.

In another possible case, the access network device for measuring includes a second access network device for measuring, and the second access network device for measuring is an access network device that is determined by the location management function network element and that is configured to measure the SRS of the terminal device before the terminal device is handed over to the target cell. In other words, before the terminal device is handed over to the target cell, the access network device for measuring determined by the location management function network element includes the second access network device for measuring. That is, before the terminal device is handed over to the target cell and after the terminal device is handed over to the target cell, the second access network device for measuring is configured to measure the SRS sent by the terminal device.

For example, before the terminal device is handed over to the target cell, access network devices for measuring are an access network device for measuring 1 and an access network device for measuring 2. After the terminal device is handed over to the target cell, access network devices for measuring are the access network device for measuring 1, an access network device for measuring 3, and an access network device for measuring 4. The second access network device for measuring is the access network device for measuring 1.

In this scenario, the second message sent by the location management function network element to the second access network device for measuring may be a measurement update message, used to update the SRS configuration and/or a TRP list of the second access network device for measuring.

When the target access network device continues to use the second SRS configuration information, the second message may not include the second SRS configuration information. Alternatively, when the target access network device does not continue to use the second SRS configuration, that is, when the target access network device determines the first SRS configuration information, the second message may include the first SRS configuration information.

Certainly, the location management function network element may alternatively send the first SRS configuration information or the second SRS configuration information to the second access network device for measuring via a message other than the second message.

Optionally, in an implementation scenario of this embodiment of this application, the second message may further include third indication information, where the third indication information is used to indicate a reporting granularity of a measurement quantity of the SRS, and the reporting granularity may be understood as a difference between two neighboring values that can be reported in a reporting range.

The measurement quantity of the SRS may be, for example, a relative time of arrival in a UL-TDOA or an angle of arrival in a UL-AOA.

Optionally, an information element carrying the third indication information may be any one of the following: a timing reporting granularity factor information element, a timing reporting accuracy information element, a reporting granularity information element, or a timing reporting granularity information element. Certainly, the information element may also have another name. The name of the information element is not specifically limited in this embodiment of this application.

Optionally, for a time measurement quantity, for example, the relative time of arrival in the UL-TDOA, the reporting range of the measurement quantity of the SRS may be $[-N \times T_c, +N \times T_c]$, where N and $T_c$ are positive integers. Correspondingly, a reporting granularity T of the measurement quantity of the SRS may meet the following formula: $T=T_c \times 2^k$, where k is a natural number, that is, k is from a natural number set $\{0, 1, 2, 3, 4, 5, \ldots\}$.

Optionally, the third indication information may be a value of k, for example, 0, 1, 2, 3, 4, or 5. In this case, for example, the information element carrying the third indication information may be the timing reporting granularity factor information element. k may be referred to as the timing reporting granularity factor.

Alternatively, the third indication information may be an identifier of k, for example, k0, k1, k2, k3, k4, or k5, and values of k that are corresponding to k0, k1, k2, k3, k4, and k5 are respectively 0, 1, 2, 3, 4, and 5. In this case, for example, the information element carrying the third indication information may be the timing reporting accuracy information element, the reporting granularity information element, or the timing reporting granularity information element. Certainly, the information element may also have another name. This is not specifically limited in this embodiment of this application.

Alternatively, the third indication information may be the reporting granularity T of the measurement quantity.

Optionally, after determining the reporting granularity T, the access network device for measuring may select, based on T, a proper value from the reporting range as a measurement result for reporting.

For example, when N is 985024, $T_c$ is 1, and k is 0 to 5, the reporting granularity T of the measurement quantity of the SRS and a quantity of values that can be reported in the reporting range are shown in the following table 1.

TABLE 1

| k | T | Quantity of values that can be reported in a reporting range |
|---|---|---|
| 0 | 1 | 1970050 |
| 1 | 2 | 985026 |
| 2 | 4 | 492514 |
| 3 | 8 | 246258 |
| 4 | 16 | 123130 |
| 5 | 32 | 61566 |

It may be understood that the location management function network element may further send the third indication information to the access network device for measuring via a message other than the second message.

Based on this solution, the location management function network element may indicate the reporting granularity of the measurement quantity to the access network device for measuring based on a requirement of a positioning service, such as an accuracy requirement, thereby ensuring precision of a measurement result and precision of a positioning result, and improving positioning accuracy.

S506: The access network device for measuring measures the SRS sent by the terminal device, to obtain the measurement result of the SRS.

Optionally, if the location management function network element sends the information about the TRP of the access network device for measuring to the access network device for measuring, the TRP indicated by the information about the TRP in step S506 measures the SRS sent by the terminal device.

Optionally, if a plurality of access network devices for measuring are included in step S505, in this application, some of the plurality of access network devices for measuring are allowed to fail to obtain the measurement result of the SRS. For example, the some access network devices for measuring cannot measure the SRS due to reasons of the access network devices for measuring. In this case, a quantity of measurement results of the SRS is allowed to be less than a quantity of the access network devices for measuring.

S507: The access network device for measuring sends the measurement result of the SRS to the location management function network element. Correspondingly, the location management function network element receives the measurement result of the SRS from the access network device for measuring.

Optionally, when the location management function network element sends the reporting granularity of the measurement quantity of the SRS to the access network device for measuring, the measurement quantity may be a measurement quantity determined by the access network device for measuring based on the reporting granularity.

Optionally, after receiving the measurement result, the location management function network element may perform step S508.

S508: The location management function network element determines, based on the measurement result of the SRS, the location of the terminal device after the terminal device is handed over to the target cell.

Based on this solution, after the terminal device is handed over, the source access network device may send the identifier information of the target cell to the location management function network element, so that the location management function network element perceives the handover of the terminal device; and send the second message to the access network device for measuring based on the identifier of the target cell, to request the access network device for measuring to measure the SRS of the terminal device, so that the location management function network element can finally determine, based on the measurement result reported by the access network device for measuring, the location of the terminal device after the terminal device is handed over to the target cell, thereby completing positioning, maintaining positioning continuity, and improving a positioning success rate.

Optionally, in an implementation scenario of this embodiment of this application, before the location management function network element sends the second message to the second access network device for measuring, the communication method may further include: The location management function network element sends a notification message to the second access network device for measuring, where the notification message is used to notify the second access network device for measuring to stop measuring the SRS.

For the second access network device for measuring, refer to related descriptions in step S505. Details are not described herein again.

It may be understood that the location management function network element may consider that the target access network device does not continue to use the second SRS configuration information. To be specific, when receiving the first SRS configuration information from the target access network device, the location management function network element sends the notification message to the second access network device for measuring.

Based on the example in step S505, when the target access network device does not continue to use the second SRS configuration information, that is, the location management function network element may first send the notification message to the access network device for measuring 1, the access network device for measuring 1 is enabled to stop measuring the SRS sent by the terminal device based on the second SRS configuration information. Then, the location management function network element sends the second message to the access network device for measuring 1, to request the access network device for measuring 1 to measure, based on the first SRS configuration information, the SRS sent by the terminal device. In this case, the terminal device sends the SRS based on the first SRS configuration information.

It may be understood that, in addition to the second access network device for measuring, the location management function network element may further send the notification message to another access network device for measuring (for example, the access network device for measuring 2 in step S505) that is configured to measure the SRS sent by the terminal device before the terminal device is handed over to the target cell.

Based on this solution, before the terminal device is handed over to the target cell, the access network device for measuring configured to measure the SRS sent by the terminal device may stop measuring the SRS sent by the terminal device through configuration by the source access network device, and release resources of the access network device for measuring, thereby reducing impact on service data transmission of the access network device for measuring, and improving service performance of the access network device for measuring. In addition, power consumption of the access network device for measuring may also be reduced.

Optionally, in another implementation scenario of this embodiment of this application, the communication method may further include: The location management function network element sends fourth indication information to the target access network device, where the fourth indication information is used to indicate that the target access network device stops configuring the SRS for the terminal device.

Optionally, the location management function network element may send the fourth indication information to the target access network device when positioning succeeds or ends, for example, when the location of the terminal device is obtained, when the positioning is stopped due to some reasons, or when that the terminal device moves or is handed over is learned.

Based on this solution, the target access network device may stop configuring the SRS for the terminal device, so that the terminal device may stop sending the SRS based on a configuration of the target access network device, thereby releasing resources of the terminal device, reducing impact on service performance of the terminal device, and reducing energy consumption of the terminal device.

Figure 6:
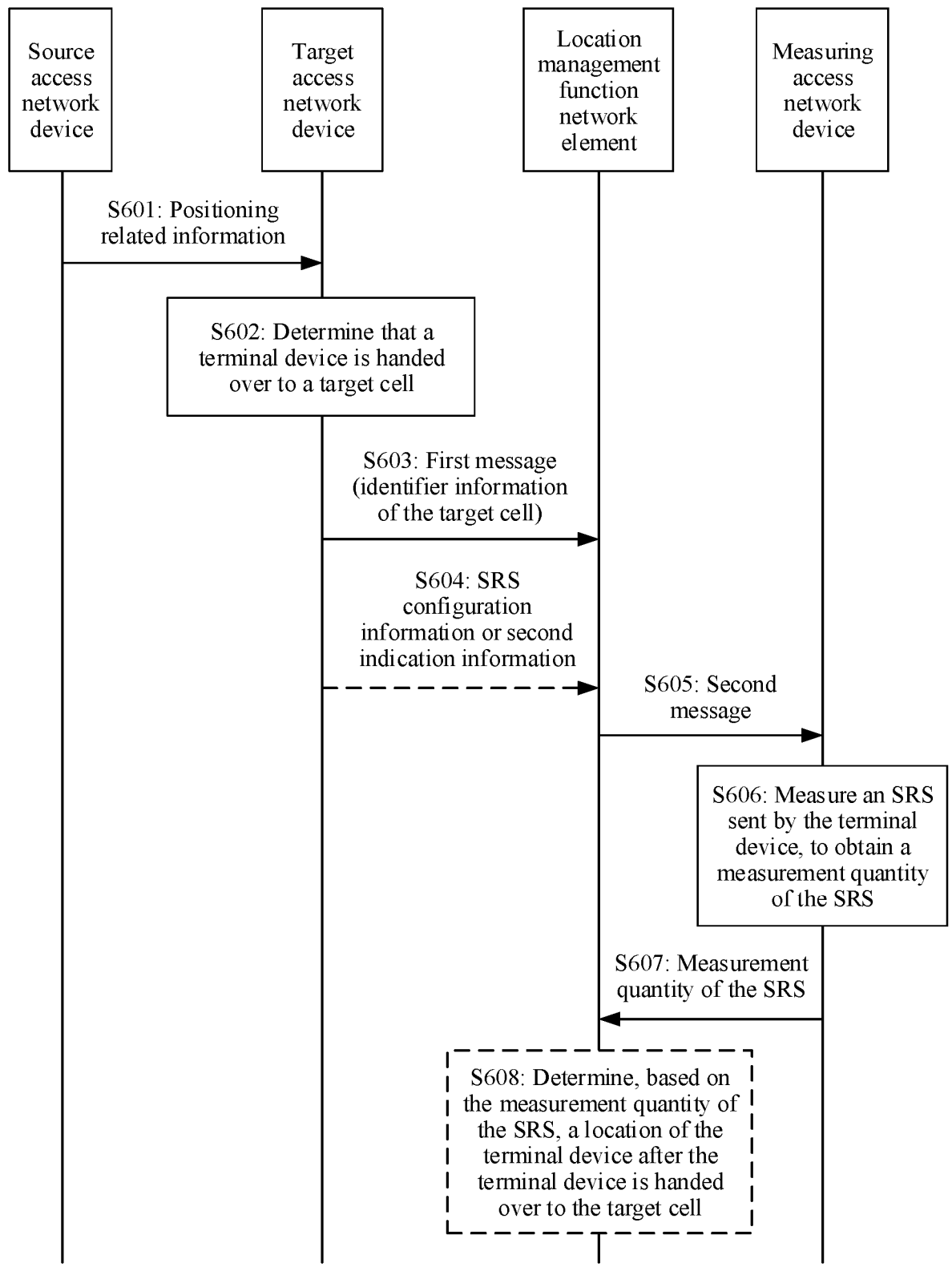
FIG. 6 is a schematic flowchart of a communication method in a scenario in which a communication device is a target access network device according to an embodiment of this application.

The following describes a communication method provided in an embodiment of this application when the foregoing communication device is a target access network device. As shown in FIG. 6, the communication method may include the following steps.

S601: A source access network device sends positioning related information to the target access network device. Correspondingly, the target access network device receives the positioning related information from the source access network device.

The positioning related information includes identifier information of a location management function network element. The identifier information of the location management function network element may be a routing identifier (Routing ID).

Further, the positioning related information further includes information about an SRS and/or fifth indication information, where the information about the SRS is used to indicate a transmission characteristic of the SRS, and the fifth indication information is used to indicate that the target access network device configures the SRS for a terminal device. Optionally, the fifth indication information may further be used to indicate that the target access network device sends configuration information of the SRS to the location management function network element.

Optionally, the positioning related information may further include other information, where for example, the location management function network element is performing a positioning service of the terminal device.

Optionally, the information about the SRS may be information sent to the source access network device before the terminal device is handed over to the target cell and when the location management function network element requests the source access network device to configure the SRS for the terminal device. For example, the information about the SRS may be information included in an SRS transmission characteristic information element of a positioning information request message sent by the location management function network element to the source access network device.

Optionally, the source access network device may send the positioning related information to the target access network device in a handover process of the terminal device.

In a possible implementation, the source access network device may include the positioning related information in a handover request message.

In another possible implementation, the source access network device may include the positioning related information in a retrieve UE context response message.

Optionally, in this possible implementation, the source access network device may send the retrieve UE context response message, and include the positioning related information in the retrieve UE context response message, in the following scenario: The terminal device fails to access a first target cell specified by the source access network device, that is, the terminal device fails to be handed over to the first target cell. Then, the terminal device initiates reestablishment to a second target cell, so that an access network device to which the second target cell belongs sends a retrieve UE context request message to the source access network device, to obtain a context of the terminal device. After receiving the retrieve UE context request message, the source access network device sends a retrieve UE context response message to the access network device to which the second target cell belongs, and includes the context of the terminal device and the positioning related information in the retrieve UE context response message. In addition, the source access network device may further release the context of the terminal device.

Optionally, the retrieve UE context request message sent by the access network device to which the second target cell belongs may include identifier information of the target cell and the like.

It may be understood that, in this possible implementation, the access network device to which the second target cell belongs is the target access network device in this embodiment of this application.

Optionally, a scenario in which the source access network device receives the retrieve UE context request message and sends the retrieve UE context response message is not specifically limited in this embodiment of this application. The source access network device may receive or send the foregoing corresponding message in another scenario.

S602: The target access network device determines that the terminal device is handed over to the target cell.

For handover of the terminal device to the target cell, refer to related descriptions in step S501. Details are not described herein again.

Optionally, that the target access network device determines that the terminal device is handed over to the target cell may include: When receiving an RRC reconfiguration complete message from the terminal device, the target access network device determines that the terminal device is handed over to the target cell.

S603: The target access network device sends a first message to the location management function network element. Correspondingly, the location management function network element receives the first message from the target access network device.

For a function of the first message and information included in the first message, refer to step S402. For a type of the first message, refer to related descriptions in step S502. Details are not described herein again.

Optionally, step S603 may be triggered by step S601. That is, after receiving the positioning related information sent by the source access network device, the target access network device may perform step S603.

S604: The target access network device sends SRS configuration information or second indication information to the location management function network element.

Optionally, when not continuing to use second SRS configuration information after receiving the positioning related information, that is, when determining first SRS configuration information, the target access network device may send the first SRS configuration information to the location management function network element, and the target access network device may send the first SRS configuration information to the terminal device, so that the terminal device sends the SRS based on the first SRS configuration information. When continuing to use the second SRS configuration information after receiving the positioning related information, the target access network device may send the second indication information or the second SRS configuration information to the location management function network element. For detailed descriptions, refer to related descriptions in the embodiment shown in FIG. 5A and FIG. 5B. Details are not described herein again.

Optionally, the target access network device may send the SRS configuration information or the second indication information to the location management function network element via a positioning information update message, or may send the SRS configuration information or the second indication information to the location management function network element via another message. A type, a function, or the like of this message is not specifically limited in this application.

Optionally, when subsequently updating an SRS configuration, the target access network device may send an updated SRS configuration to the location management function network element.

It should be noted that there is no necessary sequence between step S603 and step S604, and step S603 may be performed before step S604. Alternatively, step S604 is performed before step S603. Alternatively, step S603 and step S604 may be simultaneously performed. For example, the first message in step S603 includes the SRS configuration information or the second indication information.

It may be understood that, if the target access network device sends the first SRS configuration information to the terminal device, after receiving the first SRS configuration information, the terminal device sends the SRS based on the first SRS configuration information, so that an access network device for measuring performs measurement. If the target access network device continues to use the second SRS configuration information, the terminal device sends the SRS based on the second SRS configuration information.

In a possible implementation scenario, in step S604, a message sent by the target access network device to the location management function network element may exclude the second indication information and the second SRS configuration information. In this case, the location management function network element considers by default that the target access network device does not update the SRS configured by the source access network device for the terminal device.

In another possible implementation scenario, step S604 may not be performed. That is, step S604 is optional. In this case, the location management function network element considers by default that the target access network device does not update the SRS configured by the source access network device for the terminal device.

S605 to S608 are the same as steps S505 to S508 in the embodiment shown in FIG. 5B. Refer to the foregoing related descriptions, and details are not described herein again.

Based on this solution, after the terminal device is handed over, the target access network device may send the identifier information of the target cell to the location management function network element, so that the location management function network element perceives the handover of the terminal device; and send a second message to the access network device for measuring based on the identifier of the target cell, to request the access network device for measuring to measure the SRS of the terminal device, so that the location management function network element can finally determine, based on a measurement result reported by the access network device for measuring, the location of the terminal device after the terminal device is handed over to the target cell, thereby completing positioning, maintaining positioning continuity, and improving a positioning success rate.

Optionally, in an implementation scenario of this embodiment of this application, before the location management function network element sends the second message to a second access network device for measuring, the communication method may further include: The location management function network element sends a notification message to the second access network device for measuring, where the notification message is used to notify the second access network device for measuring to stop measuring the SRS based on the second SRS configuration information.

Optionally, in another implementation scenario of this embodiment of this application, the communication method may further include: The location management function network element sends fourth indication information to the target access network device, where the fourth indication information is used to indicate that the target access network device stops configuring the SRS for the terminal device.

For detailed descriptions and corresponding technical effects in the two implementation scenarios, refer to related descriptions in the foregoing embodiment. Details are not described herein again.

Figure 7A:
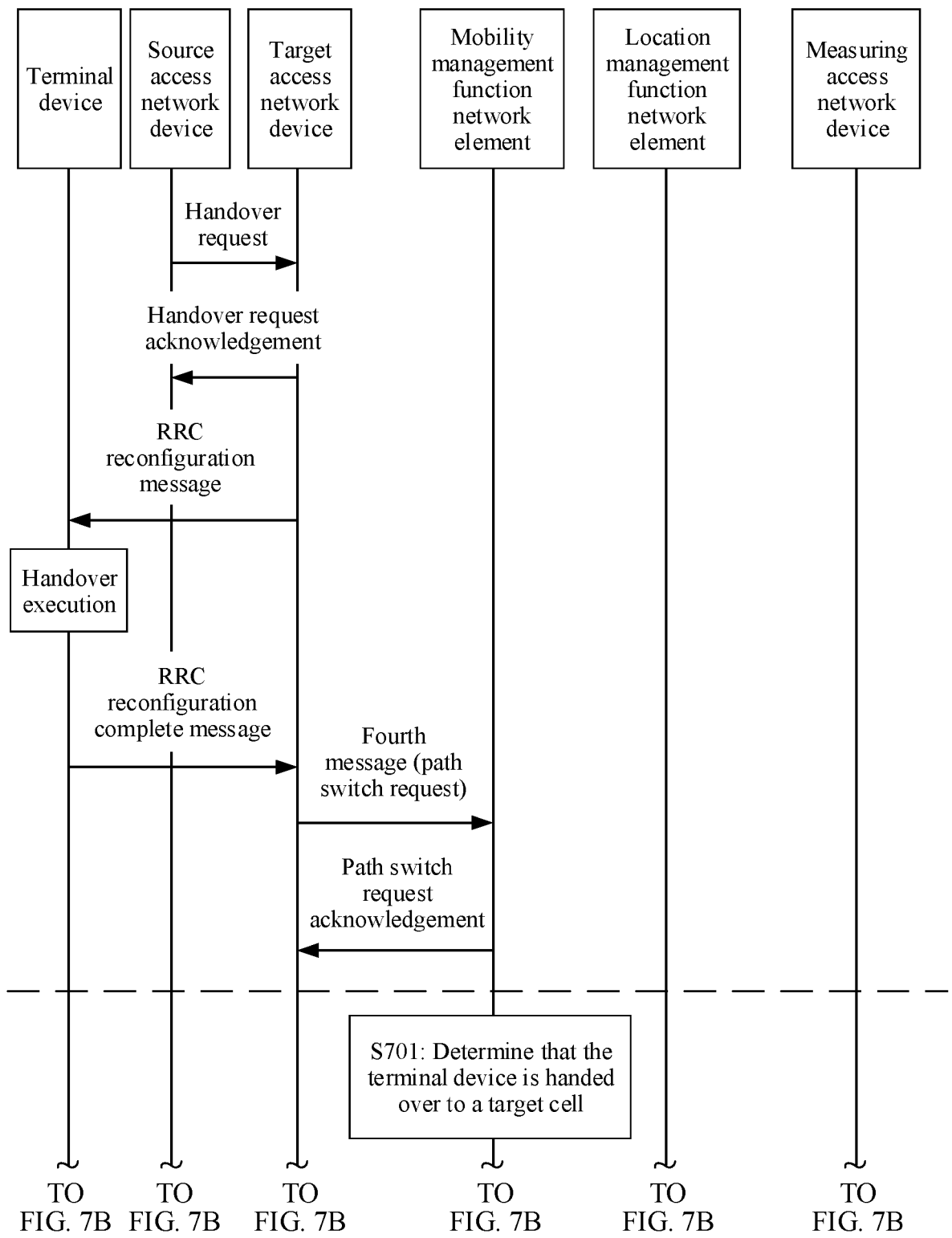
FIG. 7A and FIG. 7B are a schematic flowchart of a communication method in a scenario in which a communication device is a mobility management function network element according to an embodiment of this application.
Figure 7B:
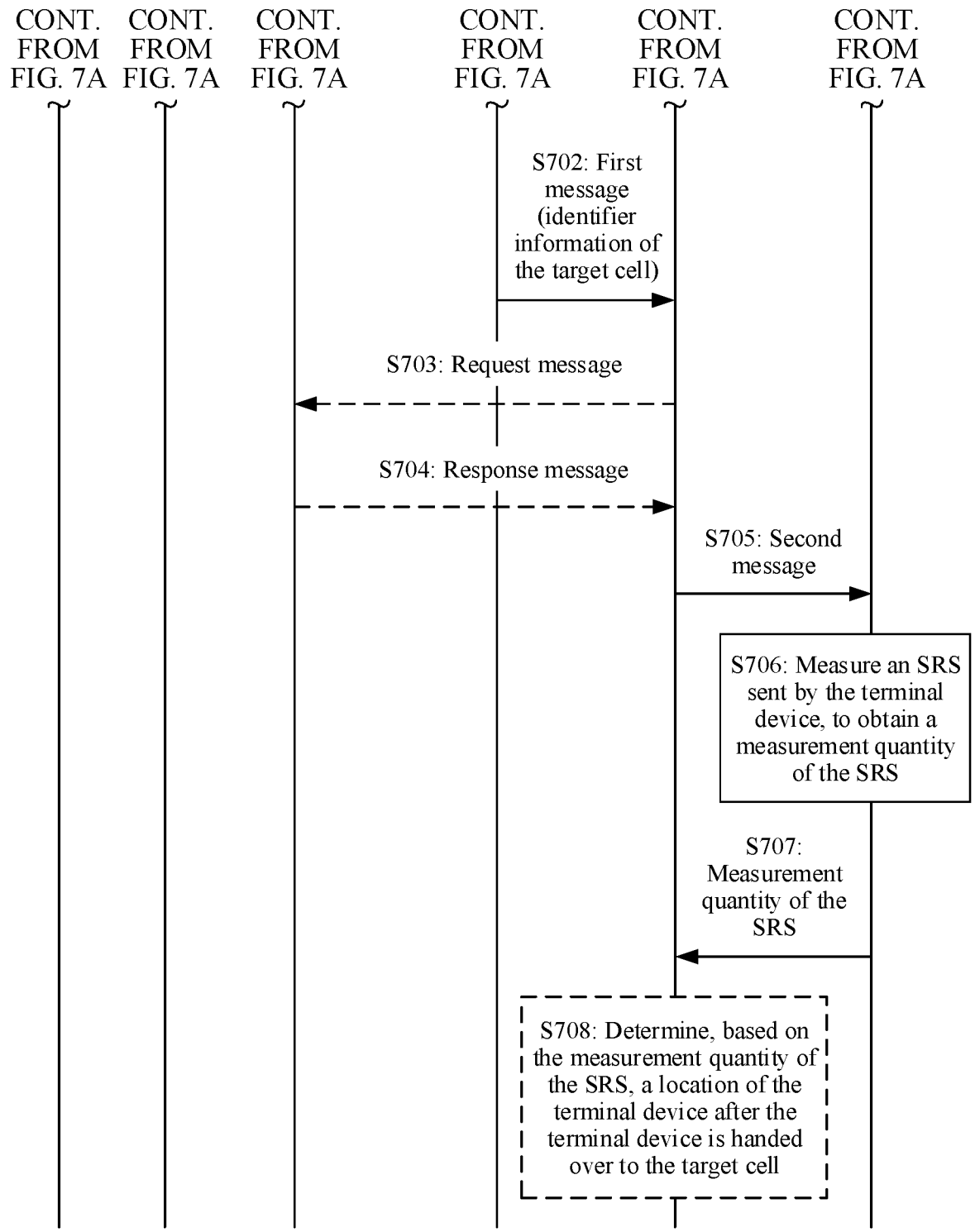

The following describes a communication method provided in an embodiment of this application when the communication device is a mobility management function network element. As shown in FIG. 7A and FIG. 7B, the communication method may include the following steps.

S701: The mobility management function network element determines that a terminal device is handed over to a target cell.

It may be understood that before step S701, the terminal device is handed over. An example of some steps in a handover procedure is shown before step S701 in FIG. 7A, and the handover procedure is not specifically limited in this embodiment of this application.

For handover of the terminal device to the target cell, refer to related descriptions in step S501. Details are not described herein again.

Optionally, that the mobility management function network element determines that a terminal device is handed over to a target cell may include: When the mobility management function network element receives a fourth message from a target access network device, the mobility management function network element determines that the terminal device is handed over to the target cell.

The fourth message is used to request to switch a downlink data path of the terminal device to the target access network device. The fourth message may be, for example, a path switch request message.

S702: The mobility management function network element sends a first message to a location management function network element. Correspondingly, the location management function network element receives the first message from the mobility management function network element.

For a function of the first message and information included in the first message, refer to step S402. Details are not described herein again.

That is, the mobility management function network element may perceive the handover of the terminal device, to notify the location management function network element of an identifier of the target cell after the handover.

S703 to S708 are the same as steps S503 to S508 in the embodiment shown in FIG. 5A and FIG. 5B. Refer to the foregoing related descriptions, and details are not described herein again.

Based on this solution, after the terminal device is handed over, the mobility management function network element may send the identifier information of the target cell to the location management function network element, so that the location management function network element perceives the handover of the terminal device; and send the second message to the access network device for measuring based on the identifier of the target cell, to request the access network device for measuring to measure the SRS of the terminal device, so that the location management function network element can finally determine, based on the measurement result reported by the access network device for measuring, the location of the terminal device after the terminal device is handed over to the target cell, thereby completing positioning, maintaining positioning continuity, and improving a positioning success rate.

Optionally, in an implementation scenario of this embodiment of this application, before the location management function network element sends the second message to a second access network device for measuring, the communication method may further include: The location management function network element sends a notification message to the second access network device for measuring, where the notification message is used to notify the second access network device for measuring to stop measuring the SRS based on the second SRS configuration information.

Optionally, in another implementation scenario of this embodiment of this application, the communication method may further include: The location management function network element sends fourth indication information to the target access network device, where the fourth indication information is used to indicate that the target access network device stops configuring the SRS for the terminal device.

For detailed descriptions and corresponding technical effects in the two implementation scenarios, refer to related descriptions in the foregoing embodiment. Details are not described herein again.

Figure 8:
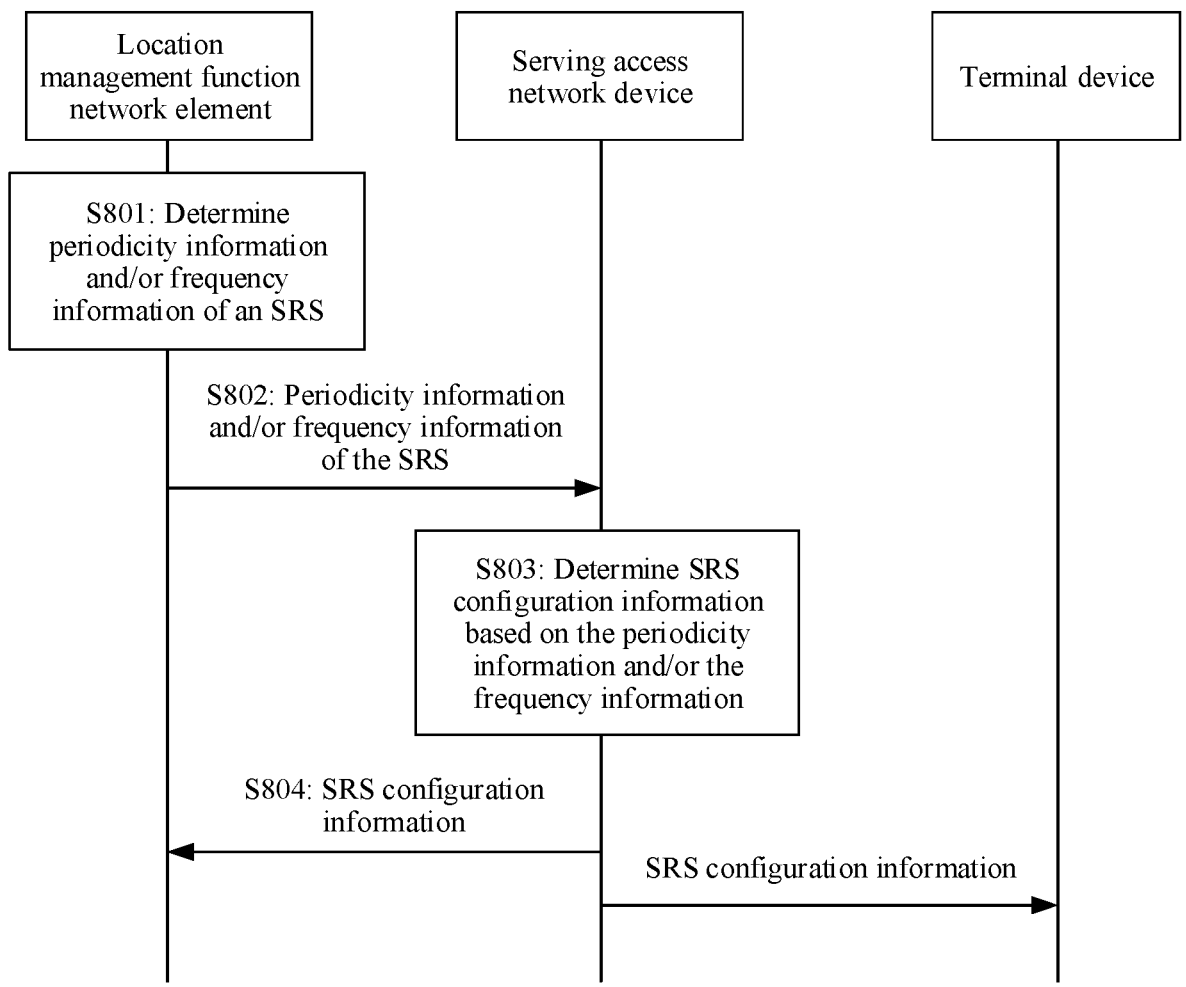
FIG. 8 is a schematic flowchart 2 of a communication method according to an embodiment of this application.

In addition, in an implementation scenario of the embodiments of this application, an embodiment of this application further provides a communication method. The communication method may be applied to various procedures in which a location management function network element determines a location of a terminal device. As shown in FIG. 8, the communication method includes the following steps.

S801: The location management function network element determines periodicity information and/or frequency information of an SRS.

Optionally, the periodicity information is used to indicate a periodicity of the SRS, and the periodicity of the SRS may be understood as a periodicity of sending the SRS by the terminal device.

Optionally, the frequency information is used to indicate a frequency of the SRS or is used to indicate a frequency of an SRS carrier. For example, the frequency may be represented by an ARFCN.

Optionally, the frequency of the SRS may be a center frequency of bandwidth occupied by the SRS, or may be a start frequency of bandwidth occupied by the SRS. The bandwidth occupied by the SRS may also be understood as transmission bandwidth of the SRS.

Optionally, the frequency of the SRS carrier may be a frequency of a carrier center of the carrier, or may be a frequency of a point A of the carrier, or the like.

Optionally, the bandwidth occupied by the SRS may be a part or all of bandwidth of the SRS carrier.

S802: The location management function network element sends the periodicity information and/or the frequency information to a serving access network device.

The serving access network device is an access network device to which a current serving cell of the terminal device belongs.

When the location management function network element determines the periodicity information of the SRS, in step S802, the location management function network element sends the periodicity information. When the location management function network element determines the frequency information of the SRS, in step S802, the location management function network element sends the frequency information.

Optionally, the location management function network element may send the periodicity information and/or the frequency information to the serving access network device via a positioning information request message. Further, the periodicity information and/or the frequency information may be included in an SRS transmission characteristic information element of the positioning information request message.

Certainly, the location management function network element may alternatively send the periodicity information and/or the frequency information to the serving access network device via another information element in another message. This is not specifically limited in this embodiment of this application.

S803: The serving access network device determines SRS configuration information based on the periodicity information and/or the frequency information.

In other words, the serving access network device configures the SRS for the terminal device based on the periodicity information and/or the frequency information.

Optionally, after receiving the periodicity information from the location management function network element, the serving access network device may configure the SRS for the terminal device based on a periodicity of the SRS that is recommended by the location management function network element. For example, the periodicity of the SRS of the terminal device is configured as the periodicity recommended by the location management function network element. That is, the periodicity of the SRS is configured as the periodicity indicated by the periodicity information. Alternatively, the periodicity indicated by the periodicity information is adjusted to obtain an adjusted periodicity, and the periodicity of the SRS is configured as the adjusted periodicity.

Optionally, after receiving the frequency information from the location management function network element, the serving access network device may configure the SRS for the terminal device based on a frequency recommended by the location management function network element. For example, when the frequency information is used to indicate the frequency of the SRS, the frequency of the SRS is configured as a frequency recommended by the location management function network element. That is, the frequency of the SRS is configured as the frequency of the SRS that is indicated by the frequency information. Alternatively, a new frequency is determined based on the frequency of the SRS that is indicated by the frequency information, and the frequency of the SRS is configured as the new frequency. When the frequency information is used to indicate a frequency of a carrier center of the SRS carrier or a frequency of a point A, the serving access network device configures the frequency of the SRS as the frequency of the carrier, or configures the SRS on the carrier.

That is, in step S803, the periodicity of the SRS that is included in the SRS configuration information determined by the serving access network device may be the same as or different from a periodicity indicated by the location management function network element. Likewise, the frequency of the SRS that is included in the SRS configuration information determined by the serving access network device may be the same as or different from a frequency indicated by the location management function network element.

S804: The serving access network device sends the SRS configuration information to the location management function network element. Correspondingly, the location management function network element receives the SRS configuration information from the serving access network device.

It may be understood that the serving access network device further sends the SRS configuration information to the terminal device. After receiving the SRS configuration information, the terminal device sends the SRS based on the SRS configuration information, facilitating measurement performed by an access network device for measuring.

When the location management function network element sends the periodicity information to the serving access network device, the periodicity of the SRS is recommended to the serving access network device, so that the serving access network device can configure, based on the periodicity recommended by the location management function network element, the periodicity of sending the SRS by the terminal device. In this way, the periodicity of the SRS that is configured by the serving access network device is close to or equal to a periodicity of the SRS that is expected by the location management function network element. In addition, when recommending the periodicity of the SRS, the location management function network element may select an appropriate periodicity based on a delay requirement of a current positioning service, and send the periodicity to the serving access network device, to control a measurement delay of the SRS by using the sending periodicity of the SRS, thereby controlling a delay of the positioning service and meeting a requirement of the positioning service.

When the location management function network element sends the frequency information to the serving access network device, the location management function network element may select an access network device for measuring, and recommend (or indicate) a frequency used for the SRS to the target access network device based on a frequency supported by the access network device for measuring selected by the location management function network element, so that the target access network device may configure the SRS for the terminal device according to the recommendation of the location management function network element. Therefore, a problem that the access network device for measuring selected by the location management function network element cannot measure the SRS because the target access network device configures the SRS at another frequency is avoided, and an SRS measurement success rate is improved, so that a positioning success rate is improved.

It should be noted that a specific application scenario of the communication method is not specifically limited in the embodiments of this application. For example, the communication method may be applied to the procedures shown in FIG. 4 to FIG. 7A and FIG. 7B, or may be applied to another positioning procedure. This is not specifically limited in the embodiments of this application.

Figure 9:
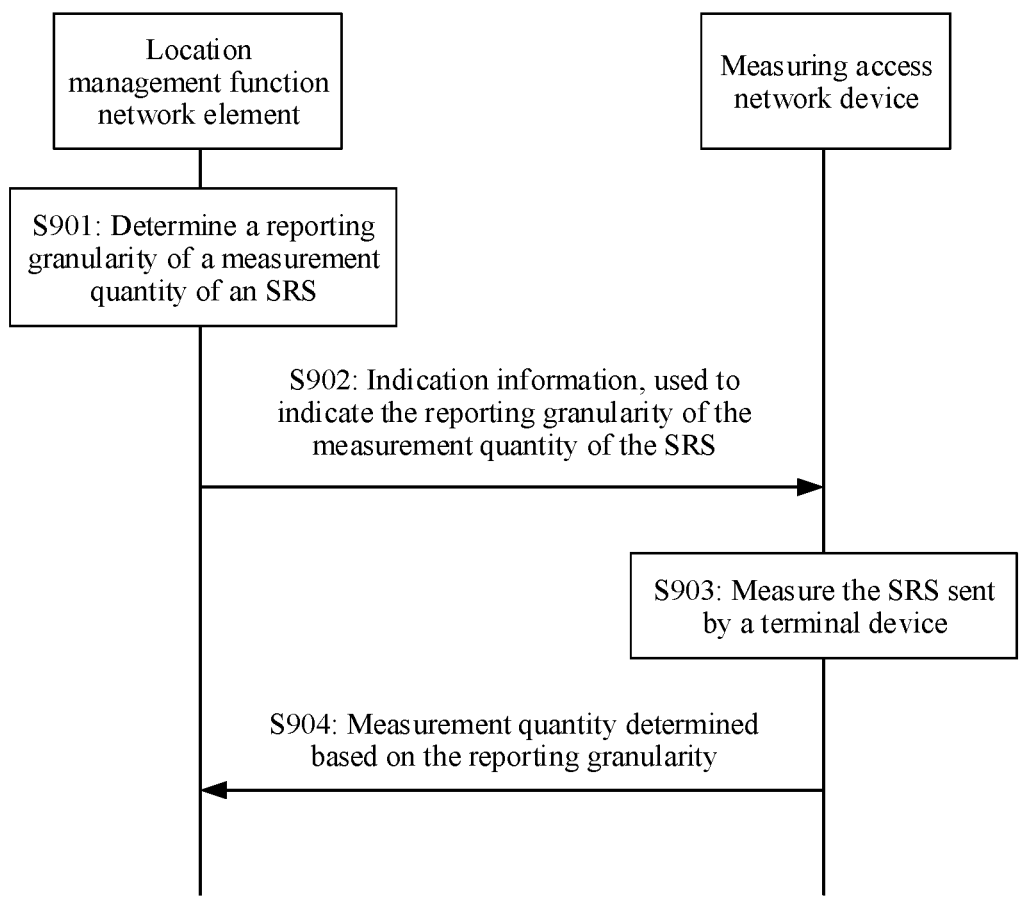
FIG. 9 is a schematic flowchart 3 of a communication method according to an embodiment of this application.

In addition, in another implementation scenario of the embodiments of this application, an embodiment of this application further provides a communication method. The communication method may be applied to various procedures in which a location management function network element determines a location of a terminal device. As shown in FIG. 9, the communication method includes the following steps.

S901: The location management function network element determines a reporting granularity of a measurement quantity of an SRS.

For related descriptions of the reporting granularity of the measurement quantity of the SRS, refer to descriptions in step S505. Details are not described herein again.

S902: The location management function network element sends indication information to an access network device for measuring. Correspondingly, the access network device for measuring receives the indication information from the location management function network element.

The indication information is used to indicate the reporting granularity of the measurement quantity of the SRS.

Optionally, the indication information is similar to the third indication information in step S505. To be specific, a feature of the third indication information in step S505 is applicable to the indication information, but the indication information is not limited to having only the feature of the third indication information. For related descriptions, refer to descriptions in step S505. Details are not described herein again.

Optionally, the location management function network element may send the indication information to the access network device for measuring via a measurement request message, or may send the indication information to the access network device for measuring via another message. This is not specifically limited in this embodiment of this application.

S903: The access network device for measuring measures the SRS sent by the terminal device.

S904: The access network device for measuring sends, to the location management function network element, the measurement result determined based on the reporting granularity. Correspondingly, the location management function network element receives the measurement result from the access network device for measuring.

That is, the access network device for measuring sends the measurement result of the SRS to the location management function network element based on the reporting granularity of the measurement quantity of the SRS. In other words, the access network device for measuring reports a measurement result of a corresponding granularity based on the reporting granularity indicated by the location management function network element. Refer to descriptions in step S505. Details are not described herein again.

Based on this solution, the location management function network element may indicate the reporting granularity of the measurement quantity to the access network device for measuring based on a requirement of a positioning service, such as an accuracy requirement, thereby ensuring precision of a measurement result and precision of a positioning result, and improving positioning accuracy.

It should be noted that a specific application scenario of the communication method is not specifically limited in the embodiments of this application. For example, the communication method may be applied to the procedures shown in FIG. 4 to FIG. 7A and FIG. 7B, or may be applied to another positioning procedure. This is not specifically limited in the embodiments of this application.

Figure 10:
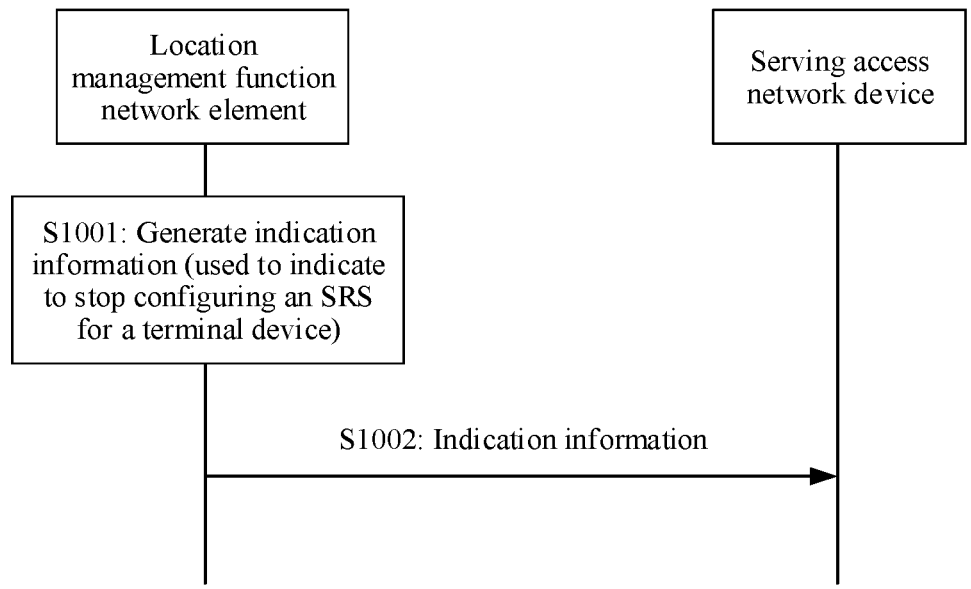
FIG. 10 is a schematic flowchart 4 of a communication method according to an embodiment of this application.

In addition, in still another implementation scenario of the embodiments of this application, an embodiment of this application further provides a communication method. The communication method may be applied to various procedures in which a location management function network element determines a location of a terminal device. As shown in FIG. 10, the communication method includes the following steps.

S1001: The location management function network element generates indication information.

The indication information is used to indicate to stop configuring an SRS for the terminal device.

Optionally, the location management function network element may generate the indication information when positioning succeeds, for example, when a location of the terminal device is obtained, when the positioning is stopped due to some reasons, or when that the terminal device moves or is handed over is learned.

S1002: The location management function network element sends the indication information to a serving access network device.

Optionally, the serving access network device is an access network device to which a current serving cell of the terminal device belongs, or may be an access network device to which a serving cell before the terminal device moves or is handed over belongs.

Optionally, after receiving the indication information, the serving access network device may stop configuring the SRS for the terminal device.

Based on this solution, the serving access network device may stop configuring the SRS for the terminal device, so that the terminal device may stop sending the SRS based on a configuration of the serving access network device, thereby releasing resources of the terminal device, reducing impact on service performance of the terminal device, and reducing energy consumption of the terminal device.

It should be noted that a specific application scenario of the communication method is not specifically limited in the embodiments of this application. For example, the communication method may be applied to the procedures shown in FIG. 4 to FIG. 7A and FIG. 7B, or may be applied to another positioning procedure. This is not specifically limited in the embodiments of this application.

It may be understood that, in the embodiments shown in FIG. 4 to FIG. 10, when the target access network device includes a CU and a DU. When the location management function network element sends the request message to the target access network device to request the SRS configuration information, the CU of the target access network device may receive the request message. Then, part or all of information (for example, the periodicity information and/or frequency information of the SRS) included in the request message is sent to the DU of the target access network device. After determining the SRS configuration based on the part or all of the information, for example, determining the SRS configuration information based on the periodicity information and/or the frequency information of the SRS, the DU sends the SRS configuration information to the CU. After receiving the SRS configuration information of the DU, the CU sends the SRS configuration information to the location management function network element. In addition, the DU may further send the SRS configuration information to the terminal device.

When the access network device for measuring includes a CU and a DU, and the location management function network element sends the request message to the access network device for measuring to request the access network device for measuring to measure the SRS of the terminal device, the CU of the access network device for measuring may receive the request message. Then, part or all of information (for example, the reporting granularity of the measurement quantity of the SRS or a timing reporting granularity factor) included in the request message is sent to the DU of the access network device for measuring. After performing measurement based on the part or all of the information, the DU returns the measurement result of the SRS (where for example, the measurement result of the SRS is a measurement result corresponding to the reporting granularity) to the CU, and then the CU returns the measurement result to the location management function network element.

Optionally, when the foregoing information is transmitted between the CU and the DU, a type or name of a message carrying the information may be the same as or different from a type or name of a message exchanged between the CU and the location management function network element. For example, a message that is used to request measurement and that is sent by the location management function network element to the CU is a measurement request message, and a message that is sent by the CU to the DU based on the measurement request message may be a positioning measurement request (Positioning Measurement Request) message.

It may be understood that, in the embodiments shown in FIG. 4 to FIG. 10, the processor 301 in the communication apparatus 300 shown in FIG. 3 may invoke the application program code stored in the memory 303, to instruct the communication device to perform actions of the devices (or network elements).

It may be understood that in the embodiments of this application, the devices (or network elements) in this application may perform some or all of steps in the embodiments of this application. These steps or operations are merely examples. In the embodiments of this application, other operations or variations of various operations may further be performed. In addition, the steps may be performed in a sequence different from a sequence presented in the embodiments of this application, and not all the operations in the embodiments of this application may be performed.

In the embodiments of this application, unless otherwise stated or there is a logical conflict, terms and/or descriptions between different embodiments are consistent and may be mutually referenced, and technical features in different embodiments may be combined based on an internal logical relationship thereof, to form a new embodiment.

It may be understood that, in the foregoing embodiments, methods and/or steps implemented by the devices (or network elements) may also be implemented by a component (for example, a chip or a circuit) that can be applied to a device (or a network element).

The foregoing mainly describes the solutions provided in the embodiments of this application from a perspective of interaction between the network elements. Correspondingly, an embodiment of this application further provides a communication apparatus, and the communication apparatus is configured to implement the foregoing methods. The communication apparatus may be the location management function network element in the foregoing method embodiments, an apparatus including the foregoing location management function network element, or a component that can be used for the location management function network element. Alternatively, the communication apparatus may be the communication device (for example, the source access network device, the target access network device, or the mobility management function network element) in the foregoing method embodiments, an apparatus including the foregoing communication device, or a component that can be used for the communication device.

It can be understood that, to implement the foregoing functions, the communication apparatus includes a corresponding hardware structure and/or software module for performing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that module division in the embodiments of this application is an example, and is merely a logical function division. During actual implementation, another division manner may be used.

Figure 11:
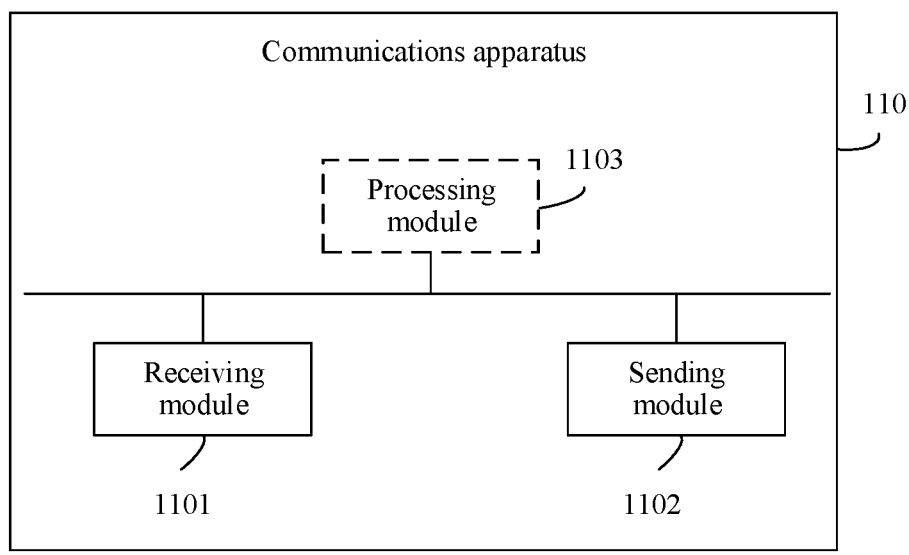
FIG. 11 is a schematic structural diagram of a communication apparatus according to an embodiment of this application.

For example, the communication apparatus performs a step of the location management function network element in the foregoing method embodiments. FIG. 11 is a schematic structural diagram of a communication apparatus 110. The communication apparatus 110 includes a receiving module 1101 and a sending module 1102.

The receiving module 1101 may also be referred to as a receiving unit, and is configured to implement a receiving function. For example, the receiving module 1101 may be a receiving circuit, a receiver machine, a receiver, or a communication interface. The sending module 1102 may also be referred to as a sending unit, and is configured to implement a sending function. For example, the sending module 1102 may be a transmitter circuit, a transmitter machine, a transmitter, or a communication interface.

Optionally, the communication apparatus 110 may further include a processing module 1103 and a storage module 1104 (not shown in FIG. 11). The storage module 1104 is configured to store data and/or instructions, and the processing module 1103 may read the data or the instructions in the storage module, to implement the methods corresponding to the foregoing embodiments.

The receiving module 1101 and the sending module 1102 are respectively configured to perform receiving and sending steps performed by the location management function network element in the foregoing method embodiments. The processing module 1103 may be configured to perform steps other than the receiving and sending steps performed by the location management function network element in the foregoing method embodiments.

In a possible implementation,

The receiving module 1101 is configured to receive a first message from a communication device, where the first message includes identifier information of a target cell. The sending module 1102 is configured to send a second message to a access network device for measuring, where the second message is used to request to measure a sounding reference signal SRS sent by a terminal device, and the SRS is used to determine a location of the terminal device after the terminal device is handed over to the target cell.

Optionally, the receiving module 1101 is further configured to receive a measurement result of the SRS. The processing module 1103 is configured to determine, based on the measurement result of the SRS, the location of the terminal device after the terminal device is handed over to the target cell.

Optionally, the sending module 1102 is further configured to send, to the access network device for measuring, information about a transmission reception point TRP of the access network device for measuring, where the information about the TRP is used to indicate the TRP that is in the access network device for measuring and that is configured to measure the SRS.

Optionally, the receiving module 1101 is further configured to receive first SRS configuration information from a target access network device, where the first SRS configuration information is used by the terminal device to send the SRS. The sending module 1102 is further configured to send the first SRS configuration information to the access network device for measuring.

Optionally, the receiving module 1101 is further configured to receive second indication information from the target access network device, where the second indication information is used to indicate that the target access network device does not update second SRS configuration information, and the second SRS configuration information is SRS configuration information determined by a source access network device. The sending module 1102 is further configured to send the second SRS configuration information to a first access network device for measuring.

Optionally, the sending module 1102 is further configured to send a request message to the target access network device, where the request message is used to request the target access network device to configure the SRS for the terminal device or is used to request SRS configuration information.

Optionally, the sending module 1102 is further configured to send a notification message to a second access network device for measuring, where the notification message is used to notify the second access network device for measuring to stop measuring the SRS.

Optionally, the sending module 1102 is further configured to send third indication information to the access network device for measuring, where the third indication information is used to indicate a reporting granularity of the measurement quantity of the SRS.

Optionally, the sending module 1102 is further configured to send fourth indication information to the target access network device, where the fourth indication information is used to indicate that the target access network device stops configuring the SRS for the terminal device.

In another possible implementation,

The processing module 1103 is configured to determine periodicity information and/or frequency information of an SRS, where the periodicity information is used to indicate a periodicity of the SRS, and the frequency information is used to indicate a frequency of the SRS or used to indicate a frequency of an SRS carrier. The sending module 1102 is configured to send the periodicity information and/or the frequency information to a serving access network device.

In still another possible implementation,

The processing module 1103 is configured to determine a reporting granularity of a measurement quantity of an SRS. The sending module 1102 is configured to send indication information to an access network device for measuring, where the indication information is used to indicate the reporting granularity of the measurement quantity of the SRS.

In yet another possible implementation, The processing module 1103 is configured to generate indication information, where the indication information is used to indicate to stop configuring an SRS for a terminal device. The sending module 1102 is configured to send the indication information to a serving access network device.

All related content of the steps in the foregoing method embodiments may be cited in function descriptions of a corresponding functional module, and details are not described herein again.

It may be understood that the foregoing modules may be independently disposed, or may be integrated. This is not limited in this embodiment of this application.

In a possible manner, the communication apparatus 110 is presented in a form of functional modules obtained through integration. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus 110 may be in the form of the communication apparatus 300 shown in FIG. 3.

For example, the processor 301 in the communication apparatus 300 shown in FIG. 3 may invoke the computer execution instructions stored in the memory 303, to enable the communication apparatus 300 to perform the communication method in the foregoing method embodiments.

Specifically, a function/an implementation process of the receiving module 1101, the sending module 1102, or the processing module 1103 in FIG. 11 may be implemented by the processor 301 in the communication apparatus 300 shown in FIG. 3 by invoking the computer execution instructions stored in the memory 303. Alternatively, a function/an implementation process of the processing module 1103 in FIG. 11 may be implemented by the processor 301 in the communication apparatus 300 shown in FIG. 3 by invoking the computer execution instructions stored in the memory 303, and a function/an implementation process of the receiving module 1101 or the sending module 1102 in FIG. 11 may be implemented through the communication interface 304 in the communication apparatus 300 shown in FIG. 3.

The communication apparatus 110 provided in this embodiment may be configured to perform the foregoing communication methods. Therefore, for technical effects that can be obtained by the apparatus, refer to the foregoing method embodiments. Details are not described herein again.

Figure 12:
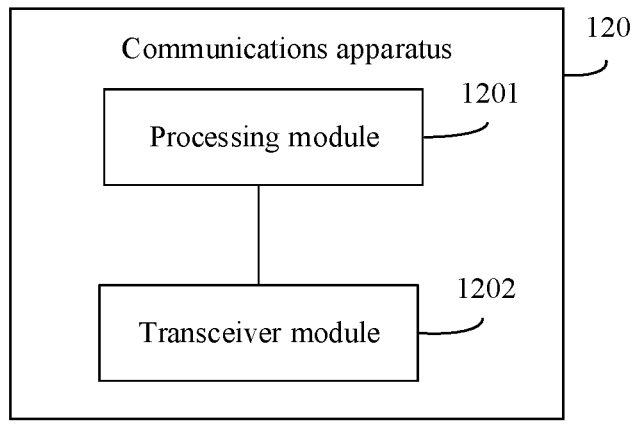
FIG. 12 is a schematic structural diagram of another communication apparatus according to an embodiment of this application.

Alternatively, for example, the communication apparatus implements a step of the communication device (for example, the source access network device, the target access network device, or the mobility management function network element) in the foregoing method embodiments. FIG. 12 is a schematic structural diagram of a communication apparatus 120. The communication apparatus 120 includes a processing module 1201 and a transceiver module 1202.

The transceiver module 1202 may also be referred to as a transceiver unit, and is configured to implement a sending function and/or a receiving function. The transceiver module 1202 may be, for example, a transceiver circuit, a transceiver machine, a transceiver, or a communication interface.

The transceiver module 1202 may include a receiving module and a sending module, which are respectively configured to perform receiving and sending steps performed by the communication device in the foregoing method embodiments. The processing module 1201 may be configured to perform steps other than the receiving and sending steps performed by the communication device in the foregoing method embodiments.

The processing module 1201 is configured to determine that a terminal device is handed over to a target cell. The transceiver module 1202 is configured to send a first message to a location management function network element, where the first message includes identifier information of the target cell.

Optionally, the communication apparatus is a source access network device, and that the processing module 1201 is configured to determine that a terminal device is handed over to a target cell may include: When the transceiver module 1202 receives a third message from a target access network device, the processing module 1201 is configured to determine that the terminal device is handed over to the target cell, where the third message is used to notify the communication apparatus to release a context of the terminal device or is used to request a context of the terminal device from the communication apparatus.

Optionally, the communication apparatus may be a target access network device, the transceiver module 1202 is further configured to receive identifier information of a location management function network element and information about an SRS that are from a source access network device, where the information about the SRS is used to indicate a transmission characteristic of the SRS.

Optionally, the transceiver module 1202 is further configured to send first SRS configuration information to the location management function network element, where the first SRS configuration information is used by the terminal device to send the SRS, and the SRS is used to determine a location of the terminal device.

Optionally, the transceiver module 1202 is further configured to send second indication information to the location management function network element, where the second indication information is used to indicate that the target access network device does not update second SRS configuration information, and the second SRS configuration information is SRS configuration information determined by the source access network device.

Optionally, the transceiver module 1202 is further configured to receive a request message from the location management function network element, where the request message is used to request the target access network device to configure the SRS for the terminal device or is used to request SRS configuration information.

Optionally, the communication apparatus may be a mobility management function network element, and that the processing module 1201 is configured to determine that a terminal device is handed over to a target cell may include: When the transceiver module 1202 receives a fourth message from a target access network device, the processing module 1201 is configured to determine that the terminal device is handed over to the target cell, where the fourth message is used to request to hand over a downlink data path of the terminal device to the target access network device. All related content of the steps in the foregoing method embodiments may be cited in function descriptions of a corresponding functional module, and details are not described herein again.

Optionally, the communication apparatus 120 may further include a storage module (not shown in FIG. 12), configured to store data and/or instructions. The processing module 1201 may read the data or the instructions in the storage module, to implement the methods corresponding to the foregoing embodiments.

It may be understood that the foregoing modules may be independently disposed, or may be integrated. This is not limited in this embodiment of this application.

In a possible manner, the communication apparatus 120 is presented in a form of functional modules obtained through integration. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus 120 may be in the form of the communication apparatus 300 shown in FIG. 3.

For example, the processor 301 in the communication apparatus 300 shown in FIG. 3 may invoke the computer execution instructions stored in the memory 303, to enable the communication apparatus 300 to perform the communication method in the foregoing method embodiments.

Specifically, functions/implementation processes of the processing module 1201 and the transceiver module 1202 in FIG. 12 may be implemented by the processor 301 in the communication apparatus 300 shown in FIG. 3 by invoking the computer execution instructions stored in the memory 303. Alternatively, a function/an implementation process of the processing module 1201 in FIG. 12 may be implemented by the processor 301 in the communication apparatus 300 shown in FIG. 3 by invoking the computer execution instructions stored in the memory 303, and a function/an implementation process of the transceiver module 1202 in FIG. 12 may be implemented through the communication interface 304 in the communication apparatus 300 shown in FIG. 3.

The communication apparatus 120 provided in this embodiment may be configured to perform the foregoing communication methods. Therefore, for technical effects that can be obtained by the apparatus, refer to the foregoing method embodiments. Details are not described herein again.

Optionally, an embodiment of this application further provides a communication apparatus (where for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to instruct the communication apparatus to perform the method in any one of the foregoing method embodiments. Certainly, the communication apparatus may not include a memory. In another possible design, the communication apparatus further includes an interface circuit. The interface circuit is a code/data read/write interface circuit, and the interface circuit is configured to: receive computer execution instructions (where the computer execution instructions are stored in a memory, may be directly read from the memory, or may pass through another component), and transmit the computer execution instructions to the processor. When the communication apparatus is a chip system, the communication apparatus may include a chip, or may include a chip and another discrete component. This is not specifically limited in this embodiment of this application.

Figure 13:
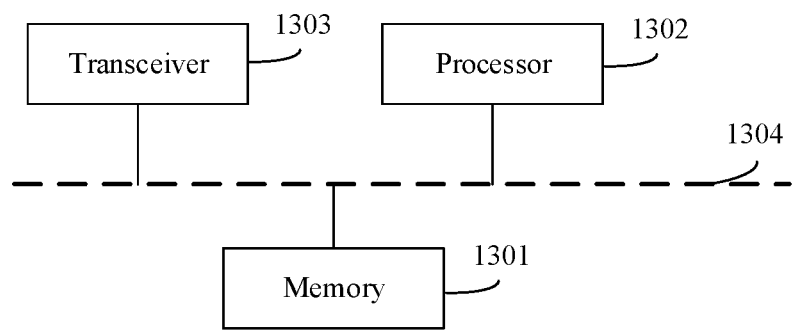
FIG. 13 is a schematic structural diagram of still another communication apparatus according to an embodiment of this application.

Optionally, as shown in FIG. 13, an embodiment of this application further provides a communication apparatus 130. The communication apparatus 130 includes a processor 1302, a transceiver 1303, and a memory 1301.

The transceiver 1303 may be an independently disposed transmitter, and the transmitter may be configured to send information to another device. Alternatively, the transceiver may be an independently disposed receiver, configured to receive information from another device. Alternatively, the transceiver may be a component integrating functions of sending and receiving information. A specific implementation of the transceiver is not limited in the embodiments of this application.

Optionally, the communication apparatus 130 may further include a bus 1304. The transceiver 1303, the processor 1302, and the memory 1301 may be connected to each other by using the bus 1304. The bus 1304 may be a peripheral component interconnect (peripheral component interconnect, PCI) bus, an extended industry standard architecture (extended industry standard architecture, EISA) bus, or the like. The bus 1304 may be classified into an address bus, a data bus, a control bus, and the like. For ease of representation, only one thick line is used to represent the bus in FIG. 13, but this does not mean that there is only one bus or only one type of bus.

The transceiver 1303 may perform receiving and sending steps in the foregoing method embodiments. The memory 1301 is configured to store data and/or instructions, and the processor 1302 may read the data or the instructions in a storage module, to implement the methods corresponding to the foregoing embodiments.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the apparatuses described above.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application, provided that they fall within the scope of protection defined by the following claims and their equivalent technologies in this application.

What is claimed is:

1. A communication method comprising:
    determining, by a location management function (LMF) network element, first periodicity information of a sounding reference signal (SRS), wherein the determined first periodicity information indicates a first periodicity of the SRS;
    sending, by the LMF network element, the determined first periodicity information to a serving access network device;
    receiving, by the LMF network element and in response to sending the determined first periodicity information, second periodicity information from the serving access network device, wherein the second periodicity information indicates a second periodicity of the SRS, and wherein the second periodicity of the SRS is determined based on the first periodicity of the SRS sent by the LMF network element; and
    sending, by the LMF network element, a measurement request message to at least one of the serving access network device or a neighbor access network device, wherein the measurement request message comprises the determined second periodicity of the SRS.

2. The communication method of claim 1, wherein the determined first periodicity information is included in an SRS transmission characteristics information element of a positioning information request message, wherein the second periodicity information is included in SRS configuration information.

3. The communication method of claim 1, wherein the method further comprises:
    determining, by the LMF network element, first frequency information, wherein the first frequency information indicates a first frequency of a carrier used to transmit the SRS;
    sending, by the LMF network element, the first frequency information to the serving access network device; and
    receiving, by the LMF network element and in response to sending the first frequency information, second frequency information from the serving access network device, wherein the second frequency information indicates a second frequency of a carrier used to transmit the SRS.

4. The communication method of claim 3, wherein the first frequency information is included in an SRS transmission characteristics information element of a positioning information request message, wherein the second periodicity information is included in SRS configuration information, and wherein the second frequency of a carrier used to transmit the SRS is determined by the serving access network device based on the first frequency of a carrier used to transmit the SRS.

5. The communication method of claim 1, wherein the method further comprises:

sending, by the LMF network element, indication information to the serving access network device, where the indication information indicates to configure a terminal device to stop sending SRS.

6. The communication method of claim 1, wherein the method further comprises:
sending, by the LMF network element, a measurement request message to an access network device for measuring, wherein the measurement request message comprises a timing reporting granularity factor.

7. A communication method comprising:
receiving, by a serving access network device from a location management function (LMF) network element, first periodicity information of a sounding reference signal (SRS), wherein the first periodicity information indicates a first periodicity of the SRS;
in response to receiving the first periodicity information, determining, by the serving access network device, a second periodicity of the SRS based on the first periodicity of the SRS received from the LMF network element;
sending, by the serving access network device, second periodicity information to the LMF network element, wherein the second periodicity information indicates the determined second periodicity of the SRS;
configuring, by the serving access network device, the SRS for a terminal device; and
receiving, by the serving access network device, a measurement request message from the LMF network element, wherein the measurement request message comprises the determined second periodicity of the SRS.

8. The communication method of claim 7, wherein the first periodicity information is included in an SRS transmission characteristics information element of a positioning information request, wherein the second periodicity information is included in SRS configuration information.

9. The communication method of claim 7, wherein the method further comprises:
receiving, by the serving access network device from the LMF network element, first frequency information, and the first frequency information indicates a first frequency of a carrier used to transmit the SRS; and
transmitting, by the serving access network device and in response to receiving the first frequency information, second frequency information, wherein the second frequency information indicates a second frequency of a carrier used to transmit the SRS.

10. The communication method of claim 9, wherein the first frequency information is included in an SRS transmission characteristics information element of a positioning information request message, and wherein the second periodicity information is included in SRS configuration information, wherein the second frequency of a carrier used to transmit the SRS is determined by the serving access network device based on the first frequency of a carrier used to transmit the SRS.

11. The communication method of claim 6, wherein the method further comprises:
receiving, by the serving access network device from the LMF network element, indication information, where the indication information indicates to configure a terminal device to stop sending SRS.

12. A location management function (LMF) network element comprising at least one processor, wherein the at least one processor is coupled to at least one memory storing programming instructions executable by the at least one processor to perform operations comprising:
determining first periodicity information of a sounding reference signal (SRS), wherein the determined first periodicity information indicates a first periodicity of the SRS;
sending the determined first periodicity information to a serving access network device;
receiving, in response to sending the determined first periodicity information, second periodicity information from the serving access network device, wherein the second periodicity information indicates a second periodicity of the SRS, and wherein the second periodicity of the SRS is determined based on the first periodicity of the SRS sent to the serving access network device; and
sending a measurement request message to at least one of the serving access network device or a neighbor access network device, wherein the measurement request message comprises the determined second periodicity of the SRS.

13. The LMF network element of claim 12, wherein the determined first periodicity information is included in an SRS transmission characteristics information element of a positioning information request message, wherein the second periodicity information is included in SRS configuration information.

14. The LMF network element of claim 12, wherein the operations further comprise:
determining first frequency information, wherein the first frequency information indicates a first frequency of a carrier used to transmit the SRS;
sending the first frequency information to the serving access network device; and
receiving, in response to sending the first frequency information, second frequency information from the serving access network device, wherein the second frequency information indicates a second frequency of a carrier used to transmit the SRS.

15. The LMF network element of claim 12, wherein the operations further comprise:
sending indication information to the serving access network device, where the indication information indicates to configure a terminal device to stop sending SRS.

16. The LMF network element of claim 12, wherein the operations further comprise:
sending a measurement request message to an access network device for measuring, wherein the measurement request message comprises a timing reporting granularity factor.

17. A serving access network device comprising at least one processor, wherein the at least one processor is coupled to at least one memory storing programming instructions executable by the at least one processor to perform operations comprising:
receiving, from a location management function (LMF) network element, first periodicity information of a sounding reference signal (SRS), wherein the first periodicity information indicates a first periodicity of the SRS;
in response to receiving the first periodicity information, determining, a second periodicity of the SRS based on the first periodicity of the SRS received from the LMF network element;

sending second periodicity information to the LMF network element, wherein the second periodicity information indicates the determined second periodicity of the SRS;

configuring, the SRS for a terminal device; and receiving a measurement request message from the LMF network element, wherein the measurement request message comprises the determined second periodicity of the SRS.

18. The serving access network device of claim 17, wherein the first periodicity information of the SRS is received in a positioning information request message, wherein the second periodicity information is included in SRS configuration information.

19. The serving access network device of claim 18, wherein the first periodicity information is included in an SRS transmission characteristics information element of the positioning information request message.

20. The serving access network device of claim 17, wherein the operations further comprise:

receiving, by the serving access network device from the LMF network element, indication information, where the indication information indicates to configure a terminal device to stop sending SRS.

* * * * *

UNITED STATES PATENT AND TRADEMARK OFFICE
CERTIFICATE OF CORRECTION

PATENT NO. : 12,028,760 B2
APPLICATION NO. : 17/390299
DATED : July 2, 2024
INVENTOR(S) : Jinping Hao, Su Huang and Yinghao Jin It is certified that error appears in the above-identified patent and that said Letters Patent is hereby corrected as shown below:

In the Claims

In Column 49, In Line 1, In Claim 17, delete "sending" and insert -- sending, --.

Signed and Sealed this
Fifth Day of November, 2024

Katherine Kelly Vidal
*Director of the United States Patent and Trademark Office*